US012621779B2

(12) United States Patent
Xie et al.

(10) Patent No.:  US 12,621,779 B2
(45) Date of Patent:       May 5, 2026

(54) INTER-RAT COMMUNICATION TECHNIQUES

(71) Applicant: QUALCOMM Incorporated, San Diego, CA (US)

(72) Inventors: Ling Xie, Beijing (CN); Arvind Vardarajan Santhanam, San Diego, CA (US); Zhanyi Liu, Beijing (CN); Yongle Wu, San Diego, CA (US); Yong Li, San Diego, CA (US); Jie Mao, Beijing (CN); Scott Hoover, Del Mar, CA (US); Xuqiang Zhang, Beijing (CN); Sumit Kumar Singh, San Marcos, CA (US); Udayan Bhawnani, San Diego, CA (US); Xianwei Zhu, Beijing (CN); Albert Kim, San Diego, CA (US); Prem Swaroop Kadavakuduru, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 17/758,423

(22) PCT Filed: Jan. 8, 2020

(86) PCT No.: PCT/CN2020/070875
§ 371 (c)(1),
(2) Date: Jul. 6, 2022

(87) PCT Pub. No.: WO2021/138834
PCT Pub. Date: Jul. 15, 2021

(65) Prior Publication Data
US 2023/0026600 A1      Jan. 26, 2023

(51) Int. Cl.
*H04W 56/00*            (2009.01)

(52) U.S. Cl.
CPC .................................. *H04W 56/001* (2013.01)

(58) Field of Classification Search
CPC ............... H04W 56/001; H04W 88/06; H04W 52/0216; H04W 52/0258; H04W 52/028; H04W 76/28; H04W 56/00
See application file for complete search history.

(56) References Cited

U.S. PATENT DOCUMENTS 11,304,072 B2 * 4/2022 Siomina ................ H04W 76/28
11,950,195 B2 * 4/2024 He .................... H04W 56/0035
(Continued)

FOREIGN PATENT DOCUMENTS

CN          109788496 A      5/2019
CN          109842894 A      6/2019
(Continued)

OTHER PUBLICATIONS

International Search Report and Written Opinion—PCT/CN2020/070875—ISA/EPO—Oct. 13, 2020.
(Continued)

*Primary Examiner* — Habte Mered
(74) *Attorney, Agent, or Firm* — QUALCOMM IP DEPT.; James Hunt Yancey, Jr.

(57) ABSTRACT

Enhanced inter-RAT communication operations are disclosed. In one aspect, a device may identify one or more trigger events for monitoring control signals of another network for inter-RAT procedures, such as monitoring for one or more synchronization signal blocks (SSBs). In another aspect, the device may perform a comparison of multiple SSBs. In another aspect, the device may identify one or more release conditions for releasing local settings data associated with a customized measurement gap. In another aspect, the device may send the local settings data to a server. In another aspect, the device may send an
(Continued)

extended signaling message indicating a timing offset between network devices.

32 Claims, 11 Drawing Sheets

(56)                    References Cited

U.S. PATENT DOCUMENTS

| | | | |
|---|---|---|---|
| 2012/0178465 A1* | 7/2012 | Lin | H04W 24/10 |
| | | | 455/450 |
| 2016/0330653 A1* | 11/2016 | Yang | H04W 48/02 |
| 2018/0323922 A1 | 11/2018 | Lindoff et al. | |
| 2019/0150015 A1* | 5/2019 | Wei | H04L 27/2666 |
| | | | 370/328 |
| 2019/0239106 A1* | 8/2019 | Cui | H04W 24/08 |
| 2019/0253215 A1 | 8/2019 | Lindoff et al. | |
| 2019/0357193 A1* | 11/2019 | Bai | H04W 72/02 |
| 2020/0084642 A1* | 3/2020 | Siomina | H04W 56/001 |
| 2020/0280912 A1* | 9/2020 | Hakola | H04W 72/046 |
| 2021/0028852 A1* | 1/2021 | Hwang | H04W 72/04 |
| 2021/0227413 A1* | 7/2021 | Yang | H04W 72/0446 |
| 2021/0266854 A1* | 8/2021 | He | H04W 24/10 |

FOREIGN PATENT DOCUMENTS

| | | |
|---|---|---|
| WO | WO-2019194490 A1 | 10/2019 |
| WO | WO-2020004520 A1 | 1/2020 |

OTHER PUBLICATIONS

Samsung: "Inter RAT Mobility Defining Initial Baseline", 3GPP TSG-RAN WG2 NR AH Meeting, R2-1801082, Jan. 26, 2018 (Jan. 26, 2018), 12 pages.
Supplementary European Search Report—EP20912210—Search Authority—The Hague—Feb. 5, 2024.
Supplementary Partial European Search Report—EP20912210—Search Authority—The Hague—Sep. 6, 2023.

* cited by examiner

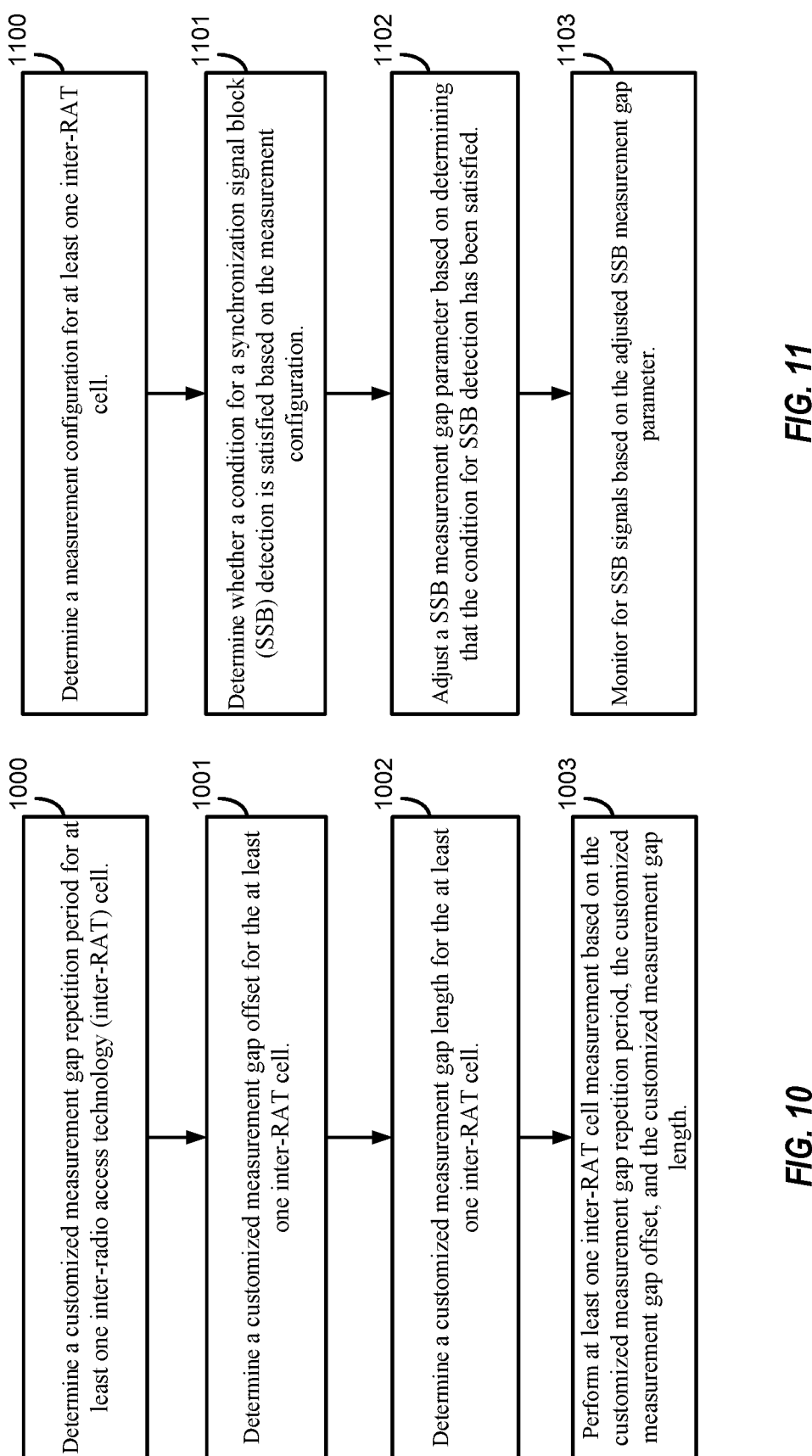

1100 Determine a measurement configuration for at least one inter-RAT cell.

1101 Determine whether a condition for a synchronization signal block (SSB) detection is satisfied based on the measurement configuration.

1102 Adjust a SSB measurement gap parameter based on determining that the condition for SSB detection has been satisfied.

1103 Monitor for SSB signals based on the adjusted SSB measurement gap parameter.

FIG. 11

1000 Determine a customized measurement gap repetition period for at least one inter-radio access technology (inter-RAT) cell.

1001 Determine a customized measurement gap offset for the at least one inter-RAT cell.

1002 Determine a customized measurement gap length for the at least one inter-RAT cell.

1003 Perform at least one inter-RAT cell measurement based on the customized measurement gap repetition period, the customized measurement gap offset, and the customized measurement gap length.

FIG. 10

INTER-RAT COMMUNICATION TECHNIQUES

TECHNICAL FIELD

Aspects of the technology discussed below relate generally to wireless communication systems, and more particularly, to inter-radio access technologies. Some aspects and techniques can enable and provide increased reliability in cell addition for different wireless technologies and synchronizing different wireless technologies.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects. Its purpose is to present some concepts of one or more aspects of the disclosure in summary form as a prelude to the more detailed description that is presented later.

Various aspects and techniques discussed below are generally directed to improving communication system operations. Some described techniques relate to improved methods, systems, devices, and apparatuses that support enhanced inter-radio access technology (inter-RAT) management procedures, including device based measurement gap configuration operations. For example, a user equipment (UE), may generate customized (e.g., local or device specific) measurement gap parameters and a customized measurement gap, extend measurement gap windows, or shift measurement gap windows to align particular control messages or windows of different radio technologies. To illustrate, a UE may "fake" a control window for a network or network device that does not support control windows or may be operating in a windowless mode by creating a local window to align control windows of different networks. For example, a UE may generate a customized or local LTE measurement gap to align a synchronization signal block (SSB) based measurement timing configuration (SMTC) window of a 5G cell and a measurement gap of an LTE cell.

As another illustration, a UE may extend or shift a network control window. For example, a UE may extend or shift a network measurement gap to align an SMTC window of a 5G cell and the measurement gap of an LTE cell. Such enhanced inter-RAT and measurement gap operations may enable enhanced operation in dual wireless modes, such as improved reliability in cell addition. For example, a device may more quickly and more successfully join a secondary cell group or account for timing drift or time shifting while connected. Accordingly, such techniques may increase reliability and throughput.

Alternatively or in addition to the foregoing examples, inter-RAT management procedures may include one or more other procedures that enhance operation of a communication system. In a first example, a UE can be configured to search for and/or measure one or more SSBs based on a communication mode of the UE, such as a connected mode discontinuous reception off (CDRX OFF) mode of operation of the UE. To illustrate, in some implementations, a network device (e.g., a base station of an LTE cell) is notified of the CDRX OFF mode and avoids sending data or messages to the UE during the CDRX OFF mode. In this case, searching for and/or measuring one or more SSBs during the CDRX OFF mode may reduce or avoid instances of data or messages from the network device interfering with the search and/or measurement of one or more SSBs. In some implementations, searching for and/or measuring one or more SSBs during the CDRX OFF mode is performed without use of a customized measurement gap (e.g., where the CDRX OFF mode is used instead of a customized measurement gap to reduce or avoid interference with SSB reception). In other implementations, the first example can be used in connection with a customized measurement gap (e.g., by searching for and/or measuring one or more SSBs during the CDRX OFF mode at a time associated with a customized measurement gap).

Alternatively or in addition, in a second example, a UE can include multiple subscriber identity modules (SIMs) (e.g., a first SIM and a second SIM). The SIMS may be physical SIMs and/or virtual, electronic SIMs. SSB searching and/or measurement can be performed at a time based on a tune-away event from the first SIM to the second SIM (or a retune event from the second SIM to the first SIM). To illustrate, in some devices, tune-away from one SIM to another SIM may be associated with momentary service interruption or data loss. For example, one or more SSBs may be lost while operation is transitioned between SIMS. In a particular example, the UE is configured to detect a tune-away event (e.g., from the first SIM to the second SIM) and to determine whether a guard time interval has expired since detecting the tune-away event. Use of the guard time interval may reduce or avoid interference with SSB reception due to a "hangover" period associated with the tune-away event.

Alternatively or in addition, in a third example, a UE can be configured to receive a plurality of SSBs from a plurality of network devices (e.g., where each of a plurality of 5G NR base stations transmits a respective SSB). The UE may be configured to select a particular network device for communication based on a comparison of the plurality of SSBs (e.g., by selecting a particular network device that is associated with the SSB having the greatest signal strength among the SSBs). In some examples, the UE is configured to schedule a customized measurement gap based on the comparison, such as by scheduling the customized measurement gap within an SMTC window of a network device associated with the SSB having the greatest signal strength among the SSBs. In some cases, the plurality of network devices may operate asynchronously. In this case, instead of creating one or more customized measurement gaps that enable SSB reception from multiple network devices of the plurality of network devices, the UE may select a particular network device of the plurality of network devices and may create a customized measurement gap to receive one or more SSBs from the particular network device.

Alternatively or in addition, in a fourth example, a UE may be configured to determine a release condition for selectively releasing (e.g., deleting, invalidating, or over-writing) certain inter-RAT data. This can include, for example, modifying local settings data associated with a customized measurement gap. In some examples, the release condition corresponds to detection of an idle mode of the UE, such as a radio resource control (RRC) idle (RRC_IDLE) mode associated with a 5G NR communication protocol. To illustrate, if the UE leaves a coverage area associated with a network device, the UE may cease communications with the network device and may enter the RRC_IDLE mode. Because a customized measurement gap may be specific to timing (e.g., an SMTC window) of the network device, the UE may release the local settings data upon ceasing to communicate with the network device and entering the RRC_IDLE mode. In another example, the release condition corresponds to expiration of a threshold time interval since receiving an SSB from the network device. For example, the UE may determine, upon expiration of the threshold time interval, that timing of the customized measurement gap indicated by the local settings data is likely to be "stale" (e.g., due to clock drift). In this case, the UE may release the local settings data in response to detecting expiration of the threshold time interval since receiving the SSB. In another example, the release condition corresponds to termination of communication with the network device, such as in response to a handover from the network device to another network device or in response to reestablishment of communications with another network device after a radio link failure. Because a customized measurement gap may be specific to timing of the network device, a UE may release the local settings data upon terminating communications with the network device.

Alternatively or in addition, in a fifth example, SSB searching and/or measurement may be disabled by a UE during a high priority event. In some scenarios, a UE can be configured to selectively initiate SSB searching and/or measurement based on detecting termination of the high priority event. As a particular example, the high priority event may include a voice over Long-Term Evolution (VoLTE) call performed by the UE, and SSB searching and/or measurement may be disabled during the VoLTE call (e.g., to reduce or avoid loss of one or more data packets associated with the VoLTE call, or to reduce or avoid clipping or other sound artifacts during the VoLTE call).

Alternatively or in addition, in a sixth example, a server is in communication with a plurality of network devices and can be configured to maintain a database. The database can hold or store data or information related to IRAT communication. The information may be "crowd-sourced" from a plurality of UEs. To illustrate, the database may indicate customized measurement gaps determined by the plurality of UEs. As an example, a first UE may send, to the server, a message indicating a customized measurement gap determined by the UE for communication with a first network device (e.g., a 4G LTE base station) and a second network device (e.g., a 5G NR base station). The server may update the information of the database to associate the customized measurement gap with the first network device and the second network device. Upon detecting a second UE in communication with the first network device and the second network device, the server may send an indication of the customized measurement gap to the second UE. Further, the first UE may periodically or occasionally update the customized measurement gap (e.g., in response to clock drift, as an illustrative example). The first UE may send one or more updates of the customized measurement gap to the server, and the server may forward the one or more updates to one or more UEs in communication with the first network device and the second network device, such as the second UE.

Alternatively or in addition, in a seventh example, a UE can be configured to indicate a timing offset between a first network device (e.g., a 4G LTE base station) and a second network device (e.g., a 5G NR base station). The UE may send an extended signaling message indicating the timing offset to the first network device, to the second network device, to a server, or a combination thereof. The indication of the timing offset may be used to initiate a handshake between the first network device and the second network device (e.g., to synchronize timing of the first network device and the second network device, such as by aligning a measurement gap of the first network gap and an SMTC window of the second network gap). As a result, SSB searching and/or measurement may be more efficient for one or more other UEs.

Additional examples can include one or more additional aspects. As an example, in one aspect of the disclosure, a method of inter-radio access technology (IRAT) communication includes communicating, by a user equipment (UE) device, with a first network device that is associated with a first radio access technology (RAT). The method further includes, in response to detection of a particular communication mode of the UE device, tuning a receiver of the UE device to receive one or more synchronization signal blocks (SSBs) from a second network device that is associated with a second RAT different than the first RAT.

In another aspect of the disclosure, a method of inter-radio access technology (IRAT) communication includes communicating, by a user equipment (UE) device, with a first network device that is associated with a first radio access technology (RAT). The method further includes, based on a tune-away event from a first subscriber identity module (SIM) of the UE device to a second SIM of the UE device, tuning a receiver of the UE device to receive one or more synchronization signal blocks (SSBs) from a second network device that is associated with a second RAT different than the first RAT.

In another aspect of the disclosure, a method of inter-radio access technology (IRAT) communication includes communicating, by a user equipment (UE) device, with a first network device that is associated with a first radio access technology (RAT). The method further includes tuning a receiver of the UE device to receive a plurality of synchronization signal blocks (SSBs) from a plurality of network devices including a second network device. The second network device is associated with a second RAT different than the first RAT. The method further includes selecting the second network device from among the plurality of network devices based on a comparison of the plurality of SSBs.

In another aspect of the disclosure, a method of inter-radio access technology (IRAT) communication includes communicating, by a user equipment (UE) device, with a first network device that is associated with a first radio access technology (RAT). The method further includes releasing local settings data upon detection of a release condition, the local settings data indicating a customized measurement gap for receiving one or more synchronization signal blocks (SSBs) from a second network device that is associated with a second RAT different than the first RAT.

In another aspect of the disclosure, a method of inter-radio access technology (IRAT) communication includes communicating, by a user equipment (UE) device, with a first network device that is associated with a first radio access technology (RAT). The method further includes, in response to detection of termination of a high priority event at the UE device, tuning a receiver of the UE device to receive one or more synchronization signal blocks (SSBs) from a second network device that is associated with a second RAT different than the first RAT.

In another aspect of the disclosure, a method of inter-radio access technology (IRAT) communication includes communicating, by a user equipment (UE) device, with a first network device that is associated with a first radio access technology (RAT). The method further includes sending a message to a server, the message indicating one or more parameters of local settings data, the local settings data indicating a customized measurement gap for receiving one or more synchronization signal blocks (SSBs) from a second network device that is associated with a second RAT different than the first RAT. The method further includes, in response to detection of a failure to receive an SSB during a particular threshold time interval, tuning a receiver of the UE device to receive at least one SSB from the second network device based on parameters received from the server.

In another aspect of the disclosure, a method of inter-radio access technology (IRAT) communication includes communicating, by a user equipment (UE) device, with a first network device that is associated with a first radio access technology (RAT). The method further includes autonomously sending an extended signaling message to a particular network device. The extended signaling message indicates one or more of a synchronization difference between the first network device and a second network device or a timing offset between a measurement gap of the first network device and an SSB based measurement timing configuration (SMTC) window of the second network device. The second network device is associated with a second RAT different than the first RAT.

In another aspect of the disclosure, a method of inter-radio access technology (IRAT) communication includes communicating, by a user equipment (UE) device, with a first network device that is associated with a first radio access technology (RAT). The method further includes performing one or more of: in response to detection of a particular communication mode of the UE device, tuning a receiver of the UE device to receive one or more synchronization signal blocks (SSBs) from a second network device that is associated with a second RAT different than the first RAT; tuning the receiver to receive the one or more SSBs based on a tune-away event from a first subscriber identity module (SIM) of the UE device to a second SIM of the UE device; tuning the receiver to receive a plurality of SSBs from a plurality of network devices including the second network device and selecting the second network device from among the plurality of network devices based on a comparison of the plurality of SSBs; releasing local settings data upon detection of a release condition, the local settings data indicating a customized measurement gap for receiving the one or more SSBs; tuning the receiver to receive the one or more SSBs in response to detection of termination of a high priority event at the UE device; sending a message to a server, the message indicating one or more parameters of the local settings data; in response to detection of a failure to receive an SSB during a particular threshold time interval, tuning the receiver to receive at least one SSB from the second network device based on parameters received from the server; or autonomously sending an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In another aspect of the disclosure, an apparatus for inter-radio access technology (IRAT) communication includes at least one processor and a memory coupled to the at least one processor. The at least one processor is configured to initiate communications with a first network device that is associated with a first radio access technology (RAT). The at least one processor is further configured to perform one or more of: in response to detection of a particular communication mode, tune a receiver to receive one or more synchronization signal blocks (SSBs) from a second network device that is associated with a second RAT different than the first RAT; tune the receiver to receive the one or more SSBs based on a tune-away event from a first subscriber identity module (SIM) to a second SIM; tune the receiver to receive a plurality of SSBs from a plurality of network devices including the second network device and select the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event; initiate transmission of a message to a server, the message indicating one or more parameters of the local settings data; in response to detection of a failure to receive an SSB during a particular threshold time interval, tune the receiver to receive at least one SSB from the second network device based on parameters received from the server; or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In another aspect of the disclosure, a non-transitory computer-readable medium has program code recorded thereon.

The program code includes program code executable by a user equipment (UE) device for causing the UE device to communicate with a first network device that is associated with a first radio access technology (RAT). The program code further includes program code executable by the UE device for causing the UE device to perform one or more of: in response to detection of a particular communication mode of the UE device, tune a receiver of the UE device to receive one or more synchronization signal blocks (SSBs) from a second network device that is associated with a second RAT different than the first RAT; tune the receiver to receive the one or more SSBs based on a tune-away event from a first subscriber identity module (SIM) of the UE device to a second SIM of the UE device; tune the receiver to receive a plurality of SSBs from a plurality of network devices including the second network device and selecting the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event at the UE device; send a message to a server, the message indicating one or more parameters of the local settings data; in response to detection of a failure to receive an SSB during a particular threshold time interval, tune the receiver to receive at least one SSB from the second network device based on parameters received from the server; or autonomously send an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In another aspect of the disclosure, an apparatus for inter-radio access technology (IRAT) communication includes means for storing instructions. The apparatus further includes means for executing the instructions to initiate communications with a first network device that is associated with a first radio access technology (RAT) and to perform one or more of: in response to detection of a particular communication mode, tune a receiver to receive one or more synchronization signal blocks (SSBs) from a second network device that is associated with a second RAT different than the first RAT; tune the receiver to receive the one or more SSBs based on a tune-away event from a first subscriber identity module (SIM) to a second SIM; tune the receiver to receive a plurality of SSBs from a plurality of network devices including the second network device and select the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event; initiate transmission of a message to a server, the message indicating one or more parameters of the local settings data; in response to detection of a failure to receive an SSB during a particular threshold time interval, tune the receiver to receive at least one SSB from the second network device based on parameters received from the server; or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In another aspect of the disclosure, a method of server operation includes receiving, at a server, a message from a first user equipment (UE) device. The message indicates one or more parameters of local settings data determined by the first UE device. The method further includes adding, by the server, information to a database based on the one or more parameters, the information indicating timing parameters for a plurality of network devices. The method further includes determining, based on the information of the database, a measurement gap to be used by at least a second UE device to receive one or more synchronization signal blocks (SSBs) from a particular network device of the plurality of network devices. The method further includes sending, to the second UE device, an indication of the measurement gap.

In an additional aspect of the disclosure, a method of operation of a network device includes receiving, at a particular network device, an extended signaling message autonomously sent by a device. The extended signaling message indicates one or more of a synchronization difference between a first network device and a second network device or a timing offset between a measurement gap of the first network device and a synchronization signal block (SSB) based measurement timing configuration (SMTC) window of the second network device. The method further includes, based on the extended signaling message, sending, to a user equipment (UE) device, a reconfiguration message indicating updated settings data for the second network device.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow diagram illustrating example blocks executed by a UE configured according to an aspect of the present disclosure.

FIG. 11 is a flow diagram illustrating example blocks executed by a UE configured according to another aspect of the present disclosure.

Figure 1:
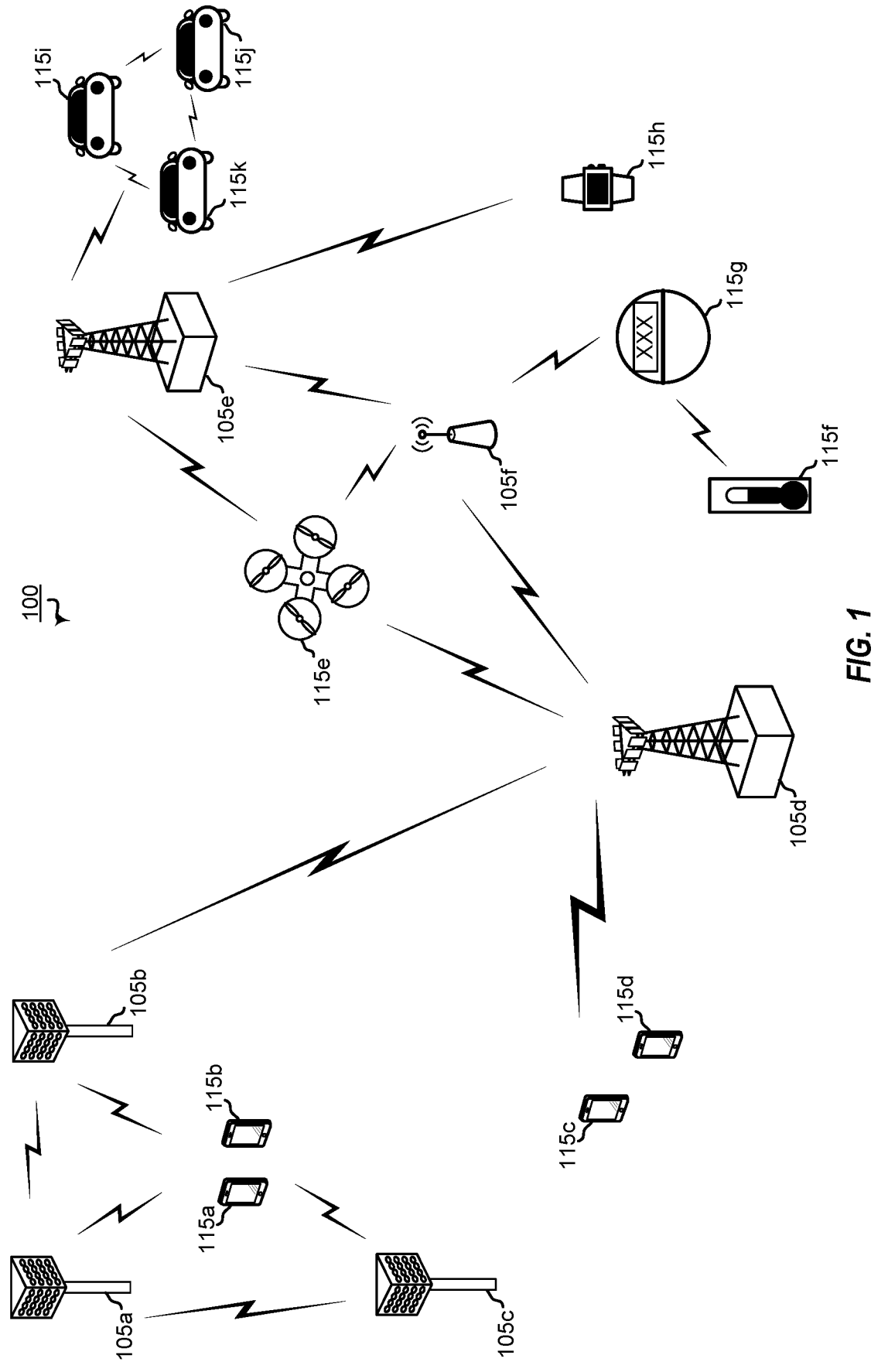
FIG. 1 is a block diagram illustrating details of a wireless communication system according to some embodiments of the present disclosure.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to inter-radio access technology (inter-RAT) operations for wireless communications. Conventionally, inter-RAT measurement operations may be based on a network measurement gap configuration. For example, a network may specify a network measurement gap (i.e., a network generated or network wide measurement gap) or network measurement gap parameters (i.e., network generated or network wide parameters) that can be used by devices (e.g., UEs) to determine the network measurement gap. The devices can then use the network measurement gap to align control messaging and/or windows of different RATs. For example, a UE may align a measurement gap of an LTE cell with an SMTC window of a 5G cell in order to add the 5G cell as a secondary cell group (SCG). However, when performing such conventional inter-RAT operations and measurement, a network or networks (e.g., LTE, 5G, or both) may not support measurement gaps or measurement gap alignment. Additionally, or alternatively, even when a network supports measurement gaps or alignment thereof, the measurement gap or parameters thereof may be incorrect for one or more reasons. For example, the timings of the different networks may not be synchronized or may be synchronized but drift from each other. As another example, a timing parameter (e.g., offset value) between the two networks may be incorrect, which results in an incorrect measurement gap determination or unaligned measurement windows.

Moreover, some UEs may have limitations that reduce or prevent some inter-RAT operations. For example, a UE may not support gapless measurement operations, or may not support concurrent or sequential measurement operations. To illustrate, a UE may not be able to track signals of two different networks at the same time, either concurrently or alternatively. Accordingly, a UE may not be able to successfully add a network and/or operate in a multiple network mode, such as a dual connectivity mode. Such procedures may not achieve high throughput and/or reliability.

The described techniques relate to improved methods, systems, devices, and apparatuses that support enhanced inter-RAT operations, including local measurement gap operations. For example, a UE can generate a customized (e.g., local or device specific) measurement gap to add a network and enable operation in the network. To illustrate, when a first network does not support measurement gaps, a UE device may fake a gap to align a measurement/control window of the first network with a measurement/control window of a second network to add the second network. That is a UE can generate a local measurement gap to align measurement and control windows of two different networks. As another example, a UE can modify a network measurement gap. To illustrate, a UE can extend or shift a network measurement gap by generating one or more local network measurement gap parameters. The UE can modify a network measurement gap during cell addition and/or can modify a network parameter during network operation. Thus, a UE can account for drift or shift in timings of networks when the networks are not time aligned or when an alignment parameter (e.g., GPS timing) is incorrect or unavailable. Such enhanced inter-RAT and measurement gap configuration operations may enable enhanced operation in multiple network modes, such as dual connectivity. Accordingly, such techniques may increase reliability and throughput and reduce latency.

This disclosure relates generally to providing or participating in communication as between two or more wireless devices in one or more wireless communications systems, also referred to as wireless communications networks. In various embodiments, the techniques and apparatuses may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 can support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
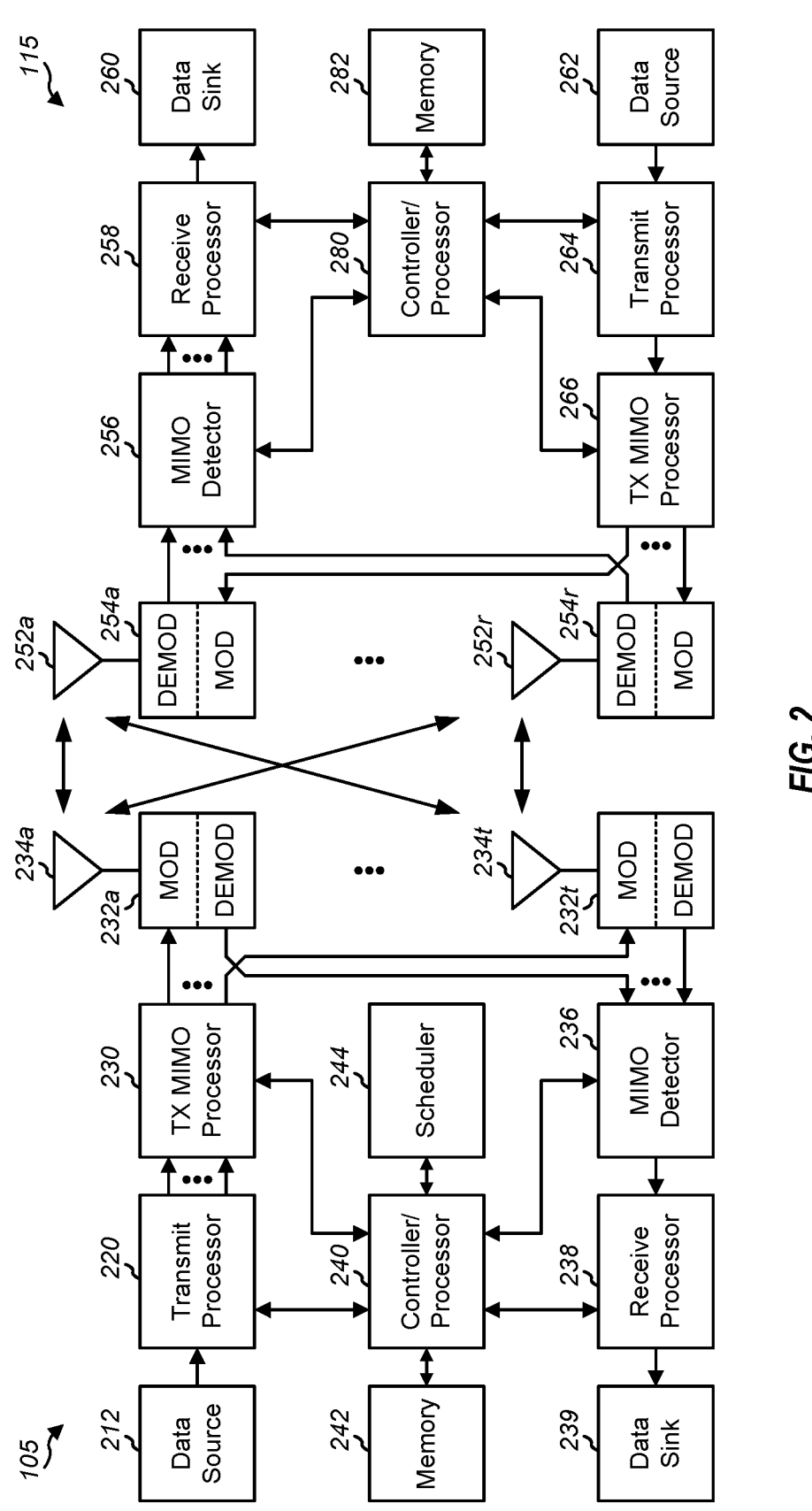
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 252, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 10 and 11, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Figure 3:
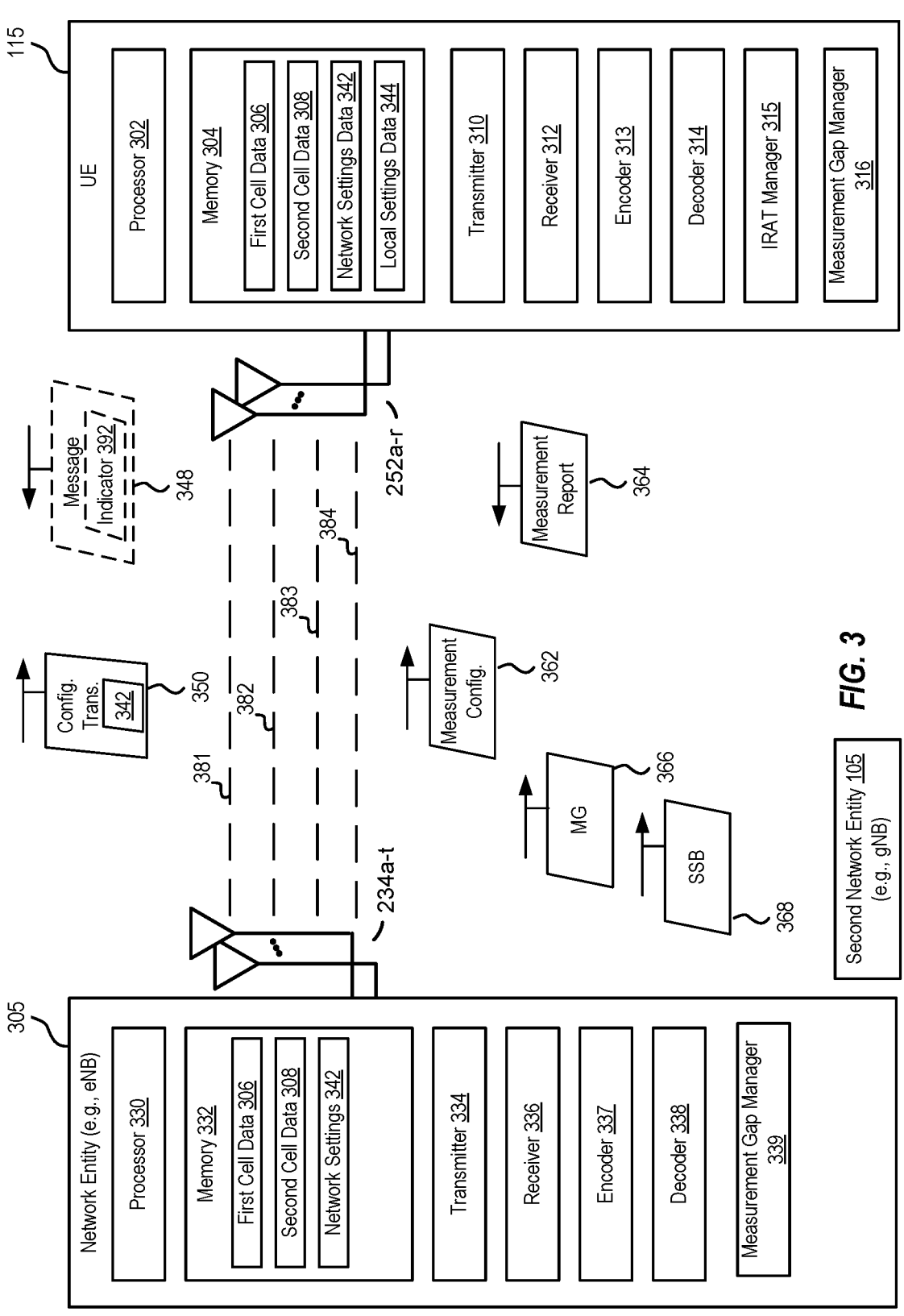
FIG. 3 is a block diagram illustrating an example of a wireless communications system (with a UE and base station) with communications that enable enhanced inter-RAT measurement and configuration operations in accordance with aspects of the present disclosure.

FIG. 3 illustrates an example of a wireless communications system 300 that supports enhanced inter-RAT measurement gap operations in accordance with aspects of the present disclosure. In some examples, wireless communications system 300 may implement aspects of wireless communication system 100. For example, wireless communications system 300 may include UE 115, network entity 305, and second network entity 105 (e.g., a second base station). Enhanced inter-RAT measurement gap operations may increase cell add reliability, and thus may increase throughput and reliability.

Network entity 305 and UE 115 and/or second network entity 105 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 305 and UE 115 may be configured to communicate via one or more component carriers (CCs), such as representative first CC 381, second CC 382, third CC 383, and fourth CC 384. Although four CCs are shown, this is for illustration only, more or fewer than four CCs may be used. One or more CCs may be used to communicate control channel transmissions, data channel transmissions, and/or sidelink channel transmissions.

For example, data and control channel transmissions 352 and 354 may be transmitted between UE 115 and network entity 305. Optionally, sidelink channel transmission may be transmitted between UE 115 and network entity 305 or second network entity 105. Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 305 and UE 115. For example, the control information may be communicated using MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 302, memory 304, transmitter 310, receiver 312, encoder, 313, decoder 314, inter-RAT manager 315, measurement gap manager 316, and antennas 252a-r. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store first cell data 306, second cell data 308, network settings data 342, local settings data 344, or a combination thereof, as further described herein.

The first cell data 306 includes or corresponds to data associated with or corresponding to network entity 305. The second cell data 308 includes or corresponds to data associated with or corresponding to second network entity 105. The cell data may include cell identifiers, cell type, cell mode, etc.

The network settings data 342 includes or corresponds to data associated with network measurement gap parameters and settings. The network settings data 342 may also include to correspond to data associated with a second measurement gap or control window, such as an SMTC window. The local settings data 344 includes or corresponds to data associated with local measurement gap parameters and settings, also referred to a customized measurement gap parameters or modified measurement gap parameters. The local settings data 344 may indicate or include measurement gap parameter data or SSB measurement gap parameter data, such as SMTC parameters. The measurement gap parameters may include or correspond to measurement gap repetition period (MGRP), a measurement gap offset (e.g., gapOffset), a measurement gap length (GPL), or a combination thereof. The measurement gap parameters may be used to determine the local measurement gap and to align the local measurement gap with the SMTC window.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Encoder 313 and decoder 314 may be configured to encode and decode data for transmission. Inter-RAT manager 315 may be configured to determine and perform inter-RAT operations. For example, inter-RAT manager 315 is configured to determine inter-RAT settings and/or modes and perform inter-RAT measurement operations. For example, inter-RAT manager 315 may cause UE 115 to monitor for control signals, such as SSBs. Measurement gap manager 316 may be configured to determine and/or evaluate measurements gap parameters and the measurement gap. For example, measurement gap manager 316 is configured to determine local measurement gap parameters and a local measurement gap (e.g., local settings data 344) based on the cell data 306, 308 and/or network settings data 342. Additionally, the measurement gap manager 316 may be configured to generate a measurement report which indicates the determined measurement gap parameters and/or measurement gap (e.g., local settings data 344).

Network entity 305 includes processor 330, memory 332, transmitter 334, receiver 336, encoder 337, decoder 338, measurement gap manager 339, and antennas 234a-t. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to first cell data 306, second call data 308, network settings data 342, local data 344, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, network entity 305 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of network entity 305 described with reference to FIG. 2.

Encoder 337, and decoder 338 may include the same functionality as described with reference to encoder 313 and decoder 314, respectively.

Measurement gap manager 339 may include similar functionality as described with reference to measurement gap manager 316. Measurement gap manager 339 is configured to receive a measurement report and adjust measurement gap operations based on the measurement report. For example, the measurement gap manager 339 may not schedule/refrain from scheduling data or may reschedule data based on the local measurement gap for a particular device indicated in a received measurement report. As another example, the measurement gap manager 339 may approve a device for joining a network or adding a cell thereof. To illustrate, the measurement gap manager 339 may cause the network entity 305 (or the second network entity 105) to send an RRC message to the UE 115 indicating that the request of the UE to add the network entity 305 (or the second network entity 105) in the measurement report 364 was approved.

During operation of wireless communications system 300, network entity 305, and/or a second network entity 105 may determine that UE 115 has enhanced inter-RAT and measurement gap management capability. For example, UE 115 may transmit a message 348 that includes an enhanced inter-RAT and measurement gap indicator 392. Indicator 392 may indicate enhanced inter-RAT and measurement gap management capability or a particular type of enhanced inter-RAT and measurement gap management, such as concurrent measurement capability. In some implementations, network entity 305 sends control information to indicate to UE 115 that enhanced inter-RAT and measurement gap management is to be used. For example, in some implementations, message 348 (or another message, such as configuration transmission 350) is transmitted by the network entity 305. The configuration transmission 350 may include or indicate to use inter-RAT and measurement gap management or to adjust or implement a setting of enhanced inter-RAT and measurement gap management.

During operation, devices of wireless communications system 300 transmit control, data, and/or sidelink channel transmissions to other devices of wireless communications system 300. For example, UE 115 and a base station (e.g., 105, 305, or both) may transmit control and data information on control and data channels. Multiple end devices or UEs may transmit control and data information on one or more sidelink channels directly to each other and independent of a base station of wireless communications system 300. One or more of the end devices or UEs may perform inter-RAT and measurement gap management operations. For example, UE 115 may receive measurement gap information and/or SSB information. Additionally, UE 115 may determine whether to modify the measurement gap or an SSB gap (SMTC window).

To illustrate, UE 115 receives a measurement configuration transmission 362 via one or more beams from second network entity 105. The measurement configuration transmission 362 may include measurement gap parameters, SSB gap (e.g., SMTC parameters), or a combination thereof. UE 115 performs inter-RAT operations responsive to receiving the measurement configuration transmission 362. For example, UE 115 monitors for SSBs from the second network entity 105 during a control window (e.g., measurement gap window) for the network entity 305.

If the UE 115 receives the SSBs, the UE 115 can add the second network entity 105 as a secondary cell group. If the UE 115 does not receive the SSBs, the UE 115 may perform enhanced inter-RAT measurement gap operations, as described further with reference to FIGS. 5-9. For example, the UE 115 may modify a measurement gap to successfully receive the SSBs. To illustrate, the UE 115 may extend or shift a measurement gap to align the measurement gap with an SMTC window to successfully receive the SSBs. For example, UE 115 modifies a network measurement gap to create a local measurement gap and updates the network entity 305 of the local measurement gap via a measurement report. To illustrate, UE 115 sends measurement report 364 to the network entity 305 which is configured to indicate that the network entity should refrain from scheduling or sending traffic for UE 115 during the local measurement gap.

The UE 115 may monitor the local measurement gap for SSBs. For example, the UE 115 receives an SSB or SSBs 368 from the second network entity 105 during the local measurement gap window. The UE 115 may optionally receive measurement gap signals 366 from the network entity 305 during the measurement gap window. Accordingly, the UE 115 may be able to join the second network entity 105 based on the SSB or SSBs 368 and operate in both networks.

In other operations, such as when the network entity 305 supports gapless configuration, the UE 115 may generate a local measurement gap, e.g., fake a gap or generate a customized measurement gap. For example, the UE 115 may not be able to dual monitor the network entity 305 and the second network entity 105 at the same time. Accordingly, the UE 115 generates its own measurement gap to monitor for SSBs. After the UE 115 has received an SSB (e.g., 368), the UE 115 may stop enhanced inter-RAT measurement gap operations and send a measurement report 364 to the network entity 305, the second network entity 105, or both.

Thus, FIG. 3 describes enhanced inter-RAT and measurement gap operations for multiple network operations. Using enhanced inter-RAT and measurement gap operations may enable improvement when operating in multiple networks. Performing enhanced inter-RAT and measurement gap operations enables a network to improve throughput and reliability.

Figures 4, 5:
FIG. 4 is a diagram of an example of a measurement gap misalignment between two networks according to some aspects that may be seen in operation.
FIG. 5 is a diagram of another example of a measurement gap misalignment between two networks according to some aspects that may be seen in operation.

FIGS. 4 and 5 illustrate timing diagrams for 5G and LTE networks. Referring to FIG. 4, FIG. 4 is a diagram of an example of a measurement gap misalignment between two networks. In FIG. 4, a measurement gap of an LTE network and an SMTC of a 5G network are not aligned due to a timing misalignment between the LTE network and the 5G network. To illustrate, a timing difference is caused by period duration mismatch between the two measurement/control windows of the networks. Specifically, a measurement gap repetition period (MGRP) of the LTE measurement gap is different from and mismatched with an SMTC period of the 5G SMTC window. Additionally, other parameters may differ or be mismatched, such as measurement gap length (MGL) and SMTC duration.

A UE that is attempting to join a 5G network based on information of the SMTC window (e.g., SSBs thereof) may utilize its radio and hardware to do so. Thus, the radio and hardware may be unavailable to monitor a measurement gap or to operate in the network. A UE that cannot concurrently monitor both the measurement gap (or operate in the network) and the SMTC window may be unable to join the 5G network while operating on the LTE network. Accordingly, the UE may need to modify the management gap to enable operation in both networks, as described in FIGS. 6-9.

FIG. 5 is a diagram of another example of a measurement gap misalignment between two networks. In FIG. 5, the measurement gap of the LTE network and the SMTC window of the 5G network are not aligned due to a timing misalignment between the LTE network and the 5G network. To illustrate, a timing difference is caused by frame misalignment between the two networks. Specifically, a frame of the LTE does not share a start time or an end time with a corresponding frame of the 5G. Said another way, a frame (e.g., start and end times thereof) of the LTE network is offset from a corresponding frame of the 5G network. Such a timing difference may be caused by a lack of a synchronization between the two networks or a timing drift between the two networks. A timing drift may occur in some networks, such as frequency division duplexing networks, due to a lack of a timing synchronization, such as the robust or strict timing synchronization present in time division duplexing networks. As described with reference to FIG. 4, under such circumstances, a UE may not be able to monitor the SMTC window and operate in the 5G network because the measurement gap may not be aligned with the SMTC window. Accordingly, the UE may need to modify the management gap to enable operation in both networks, as described in FIGS. 6-9.

Figure 6:
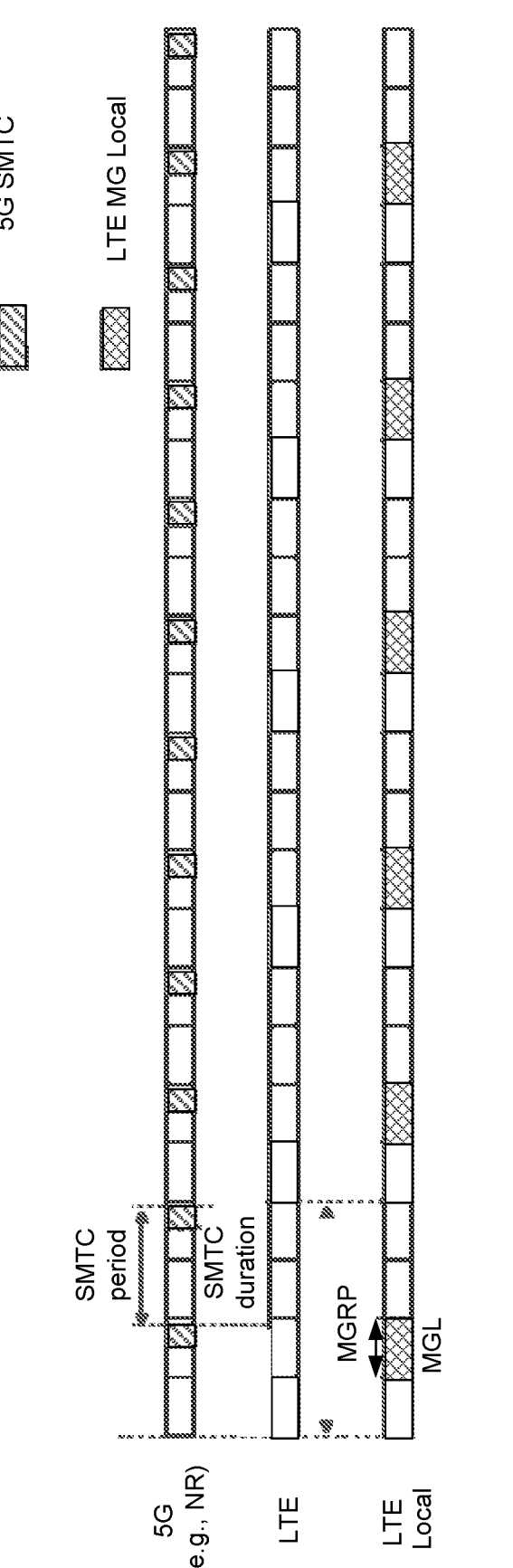
FIG. 6 is a diagram of an example of measurement gap configuration operations according to some aspects that may be seen in operation.

FIGS. 6-9 illustrate timing diagrams for 5G and LTE networks along with a local or device timing diagram for a particular UE. Referring to FIG. 6, FIG. 6 is a diagram of an example of measurement gap configuration operations. In FIG. 6, a network does not support or have a measurement gap. Such a network may be referred to as a gapless network or a network operating in a gapless mode. In such networks or modes, a UE that cannot concurrently monitor multiple (e.g., both) networks may generate a local measurement gap to enable operation in multiple (e.g., both) networks. As illustrated in FIG. 6, the LTE network does not include a measurement gap. A UE, such as UE 115, generates a local measurement gap to align the measurement gap with the SMTC window of the 5G network. The UE 115 may use preset or preconfigured values when determining the local measurement gap (and parameters thereof) and/or may determine the local measurement gap (and parameters thereof) based on the SMTC parameters. For example, an SMTC repetition period may be used to generate a measurement gap repetition period. As illustrated in the example of FIG. 6, the measurement gap repetition period (MGRP) is twice the length of the SMTC window period. By generating a local measurement gap, every other SMTC window is aligned with or at least partially overlaps the local measurement gap.

Figures 7, 8:
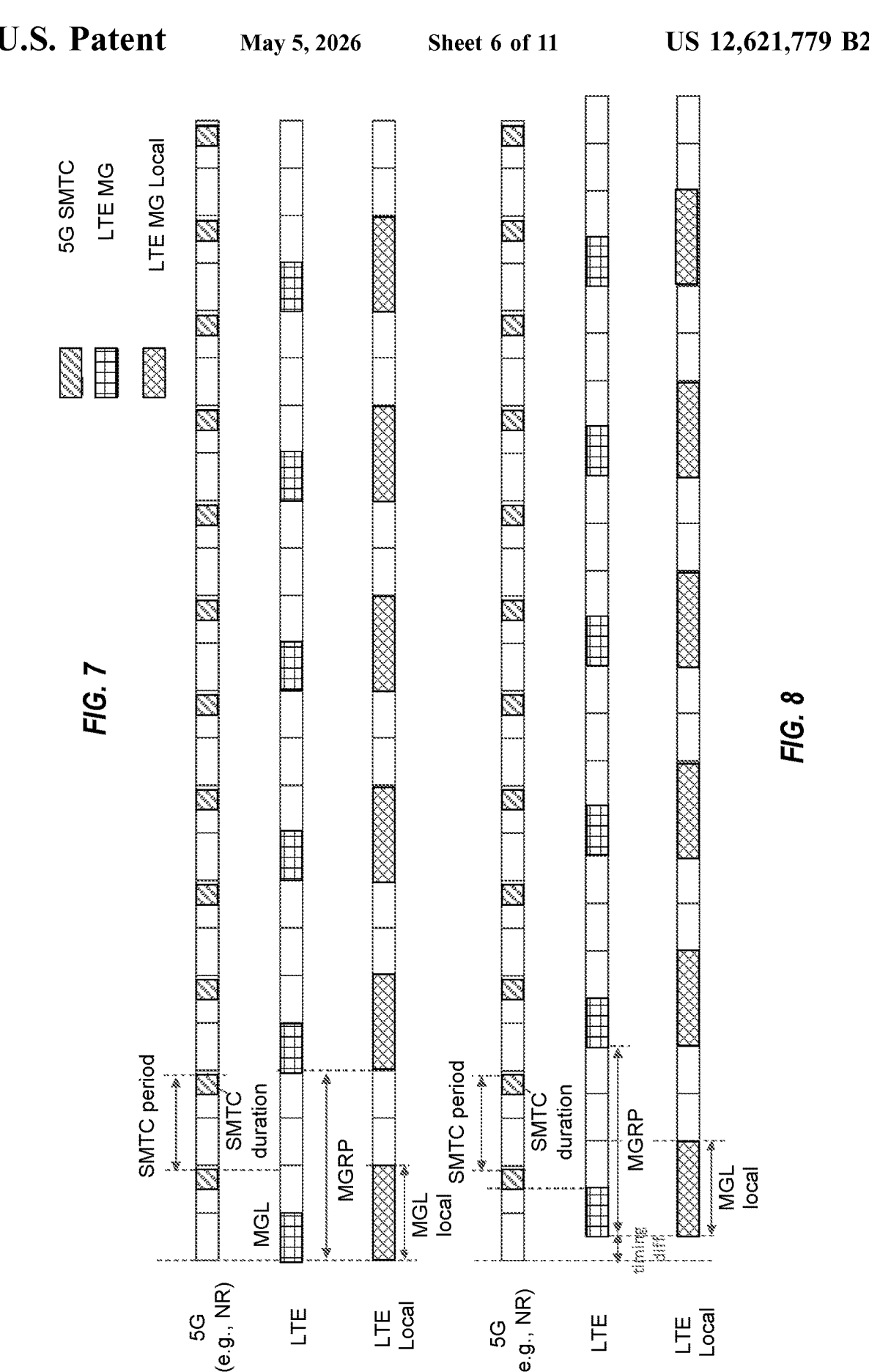
FIG. 7 is a diagram of another example of measurement gap configuration operations according to some aspects that may be seen in operation.
FIG. 8 is a diagram of yet another example of measurement gap configuration operations according to some aspects that may be seen in operation.

FIG. 7 is a diagram of another example of measurement gap configuration operations. In FIG. 7, local window extension may be performed. For example, a local SMTC parameter or a local measurement gap parameter may be generated and/or adjusted to extend the corresponding window. As illustrated in FIG. 7, a local measurement gap length (MGL local) is twice a measurement gap length (MGL) or network MGL. Accordingly, the local measurement gap length (MGL local) is then aligned with every other SMTC window of the 5G network. Although, the local measurement gap length (MGL local) is aligned with every other SMTC window in the example of FIG. 7, in other implementations, the local measurement gap length (MGL local) may be aligned with every SMTC window or every N number of SMTC windows.

A UE may perform such local measurement gap length (MGL local) generation/extension responsive to a condition being satisfied. For example, a UE may start a first timer (T1) responsive to receiving a measurement configuration for a serving cell (e.g., an LTE cell or an NR cell) The first timer may be associated with SSB detection for the serving cell. Responsive to receiving a SSB for the serving cell, the UE may reset the first timer.

Alternatively or additionally, responsive to expiration of the first timer or a value of the first timer satisfying a condition (e.g., not receiving an SSB before the timer expires), the UE may start a local measurement gap length (MGL) configuration process and/or start a second timer. The second timer is associated with inter-RAT operations and the MGL process.

During the local measurement gap length (MGL) configuration process, the UE may determine or generate a local measurement gap length based on the network measurement gap. The UE may modify the measurement gap. In some cases, the UE may lengthen or extend the network measurement gap (e.g., detection window). The UE may modify the detection window responsive to not receiving an SSB in some scenarios. In similar fashion, a UE can reduce or shorten a measurement gap.

The measurement gap may be modified in a variety of manners. To illustrate, the UE may extend the network measurement gap (e.g., detection window) by a set value, the UE may add a default or base window length value to the current detection window (e.g., cause additive growth), or the UE may double the current detection window length (e.g., cause exponential growth). The UE may keep extending the detection window until a SSB is detected. Increasing the detection window size and increasing the amount of length added may reduce the time or number of cycles to receive an SSB at the cost of increased overhead or throughput. Thus, a UE or network may adjust the detection window length value or procedures to best accommodate network resources or requirements. For example, in low data rate conditions, the UE may extend the window by a large amount or exponentially to quickly detect a SSB without sacrificing transmissions losses.

Alternatively, responsive to receiving a SSB, the second timer may be stopped, reset, or ignored. Additionally, the UE may stop local measurement gap length configuration based on receiving the SSB. In some implementations, the UE may send a measurement report responsive to or based on receiving the SSB. The measurement report may indicate to the network (e.g., LTE base station) to not schedule or send transmissions during the detection window. The measurement report may include or correspond to the measurement report of FIG. 3.

FIG. 8 is a diagram of yet another example of measurement gap configuration operations. In FIG. 8, another example of local window extension is illustrated for timing misalignment, such as described with reference to FIG. 5. For example, a local measurement gap parameter may be generated and/or adjusted to extend the local measurement gap window, as described with reference to FIG. 7, to accommodate for the timing misalignment or difference shown in FIG. 8. Similar to the example of FIG. 7, local measurement gap length is generated by extending or lengthening the network measurement gap length to accommodate the timing difference between the 5G and LTE networks.

Figure 9:
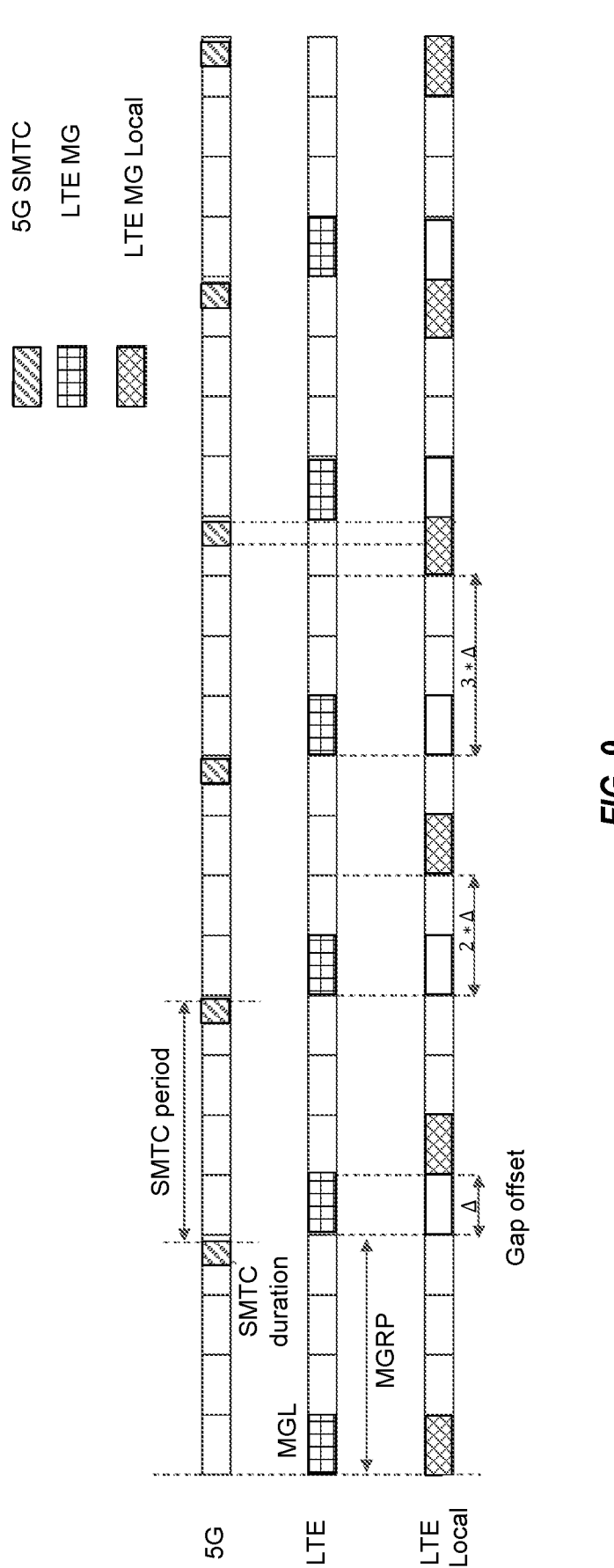
FIG. 9 is a diagram of another example of measurement gap configuration operations according to some aspects that may be seen in operation.

FIG. 9 is a diagram of another example of measurement gap configuration operations. In FIG. 9, local window shifting may be performed. For example, a local measurement gap parameter may be generated and/or adjusted to shift the corresponding local measurement gap window. For example, a measurement gap offset may be adjusted (e.g., increased) to shift the placement of the local measurement gap within a measurement gap repetition period (MGRP).

In some implementations, the UE may start to perform local window shift detection operations responsive to not receiving an SSB prior to expiration of the first timer. For example, the UE may monitor for an SSB during a network measurement gap window and not detect an SSB because the SMTC window is not aligned with the network measurement gap window. Similar to as described above with reference to FIG. 7, the UE may start a first timer responsive to receiving a measurement gap and responsive to expiration of the first timer or a value of the first timer satisfying a condition (e.g., not receiving an SSB before the timer expires), the UE may start local window shift detection and a second timer.

For example, the UE may determine or generate a shift parameter. To illustrate, the UE may determine a number of possible window locations and use the number of possible window locations to shift the local measurement gap window. For example, if the measurement gap period is 100 ms and the measurement gap length is 10 ms, then 10 possible non-overlapping positions for the measurement gap are present, i.e., 100 ms divided by 10 ms. The UE may try a first window position and increment a shift value to shift or delay the local measurement gap window with respect to a start of a measurement gap repetition period. The UE may keep shifting the window until a SSB is detected. Shifting the window without increasing an amount of length added may reduce the overhead or throughput cost for local measurement gap operations at the cost of increased time or number of cycles to receive an SSB with respect to local measurement gap extension. Thus, a UE or network may adjust the window position value or procedures to best accommodate network resources or requirements. For example, in high data transmission scenarios, the UE may shift the window (rather than extended the window) to not reduce or limit bandwidth.

Additionally, or alternatively, the UE may shift an enlarged window in response to not detecting an SSB. Thus, the UE can cover a larger portion and a distinct portion for SSB detection and can cover more different timings more quickly.

Figure 12:
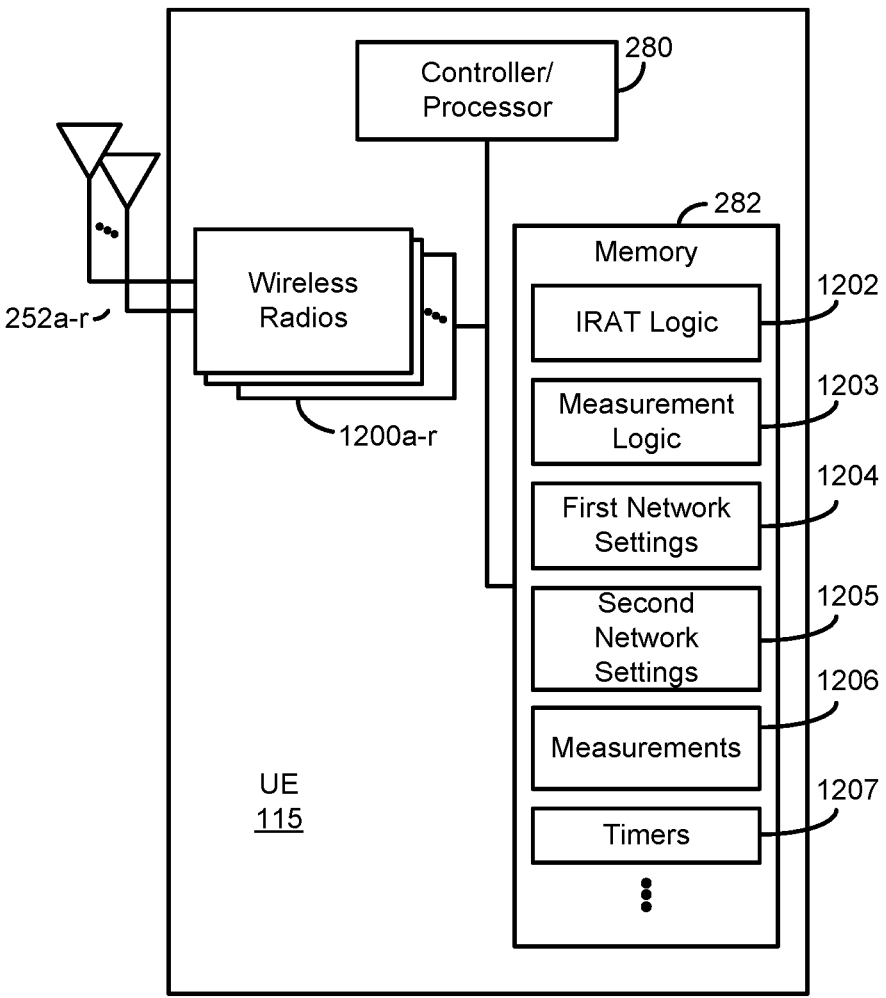
FIG. 12 is a block diagram conceptually illustrating a design of a UE configured to perform measurement gap configuration operations according to some embodiments of the present disclosure.

FIG. 10 is a flow diagram illustrating example blocks executed by a UE configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200*a-r* and antennas 252*a-r*. Wireless radios 1200*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 12, memory 282 stores inter-RAT logic 1202, measurement logic 1203, first network settings data 1204, second network settings data 1205, measurements data 1206, and timers 1207.

At block 1000, a wireless communication device, such as a UE, determines a customized measurement gap repetition period for at least one inter-radio access technology (inter-RAT) cell. A UE, such as UE 115, may receive a measurement gap configuration (e.g., indicating no measurement gap) using wireless radios 1200*a-r* and antennas 252*a-r*. The UE 115 may not be capable of gapless configuration (e.g., may not be able to concurrently or sequentially monitor two networks) and may determine a local MGRP to begin to fake or generate a local measurement gap.

The UE 115 may execute, under control of controller/processor 280, measurement logic 1202, stored in memory 282. The execution environment of inter-RAT logic 1202 provides the functionality for UE 115 to define and perform the measurement gap procedures of the inter-RAT operations. Additionally, the UE 115 may execute measurement logic 1203. The execution environment of the inter-RAT logic 802 (and optionally the measurement logic 1203) defines the different inter-RAT operations, such as measurement gap mode determination, measurement gap capability indication, local measurement gap creation, measurement gap modification (e.g., local measurement gap extending or shifting), or a combination thereof.

At block 1001, the UE 115 determines a customized measurement gap offset for the at least one inter-RAT cell. For example, the UE 115 generates a local gap offset as in FIG. 6. The UE 115 determines the local gap offset under the execution logic of the inter-RAT logic 1202.

At block 1002, the UE 115 determines a customized measurement gap length for the at least one inter-RAT cell. For example, the UE 115 determines a local measurement gap length, as described with reference to FIG. 6. To illustrate, the UE 115 may determine a measurement gap duration or window length to accommodate receiving SSB signals and to align with an SMTC window of a 5G network device.

At block 1003, the UE 115 performs at least one inter-RAT cell measurement based on the customized measurement gap repetition period, the customized measurement gap offset, and the customized measurement gap length. For example, the UE 115 determines a local measurement gap window, that is a time and a duration of the local measurement gap window. The network may not include a measurement gap window and the UE 115 may utilize the measurement gap window to monitor for signals of another network (e.g., SSBs of an SMTC window). The UE 115 may inform the network of the local measurement gap window to prevent the network (e.g., LTE network) from scheduling or sending transmissions during the local measurement gap window of the UE 115.

The UE 115 may execute additional blocks (or the UE 115 may be configured further perform additional operations) in other implementations. For example, the UE 115 may perform one or more operations described above.

Accordingly, a UE and a base station may perform enhanced inter-RAT and measurement gap operations for multiple network modes. By performing inter-RAT and measurement gap operations, throughput and reliability may be increased.

FIG. 11 is a flow diagram illustrating example blocks executed by wireless communication device configured according to another aspect of the present disclosure. The example blocks will also be described with respect to UE 115 as illustrated in FIG. 12. At block 1100, a wireless communication device, such as a UE, determines a measurement configuration for at least one inter-RAT cell. For example, UE 115 receives a measurement configuration message including data indicating one or more measurement parameters for an LTE measurement gap, a 5G SMTC window, or both.

At block 1101, the UE 115 determines whether a condition for a synchronization signal block (SSB) detection is satisfied based on the measurement configuration. For example, the UE 115 determines a timing of LTE measurement gaps and SMTC windows. If the UE 115 determines that a network LTE measurement gap is not aligned with an SMTC window, the UE may performed device or local measurement gap configuration operations.

At block 1102, the UE 115 adjusts a SSB measurement gap parameter based on determining that the condition for SSB detection has been satisfied. For example, the UE 115 adjusts or modifies a network measurement gap parameter or parameters to generate local measurement gap parameters, as described with reference to FIGS. 6-9.

At block 1103, the UE 115 monitors for SSB signals based on the adjusted SSB measurement gap parameter. For example, the UE 115 monitors for SSB signals from a 5G cell based on the local measurement gap. The UE 115 may not receive data from the LTE cell during the local measurement gap.

The UE 115 may execute additional blocks (or the UE 115 may be configured further perform additional operations) in other implementations. For example, the UE 115 may perform one or more operations described above.

Accordingly, a UE and a base station may perform enhanced inter-RAT and measurement gap operations for multiple network modes. By performing inter-RAT and measurement gap operations, throughput and reliability may be increased.

Performance of inter-RAT operations, measurement gap configuration, or both may include additional aspects, such as any single aspect or any combination of aspects described below and/or in connection with one or more other processes described elsewhere herein.

In a first aspect, the method further comprises determining a customized measurement gap for the at least one inter-RAT cell based on the customized measurement gap repetition period, the customized measurement gap offset, and the customized measurement gap length, wherein the inter-RAT measurement is performed based on the customized measurement gap.

In a second aspect, the at least one inter-RAT cell includes a first serving cell and a second serving cell, wherein, prior to performing the inter-RAT measurement, the UE is connected to the second serving cell, and wherein the second serving cell is a primary serving cell.

In a third aspect, the primary serving cell is an LTE serving cell.

In a fourth aspect, the method further comprises: determining whether to join the first serving cell based on performing the inter-RAT measurement; responsive to determining to join the first serving cell, sending a measurement report indicating that the UE requests to join the first serving cell; receiving a radio resource control (RRC) message responsive to the measurement report; and joining the first serving cell based on the RRC message.

In a fifth aspect, the customized measurement gap repetition period is determined based on one or more UE parameters, one or more network parameters, one or more channel parameters, or a combination thereof.

In a sixth aspect, the customized measurement gap repetition period is determined based on a UE capability, an active traffic type, a scheduling rate, or a combination thereof.

In a seventh aspect, the customized measurement gap offset is determined based on a synchronization signal block (SSB) measurement timing configuration (SMTC) configuration.

In an eighth aspect, the customized measurement gap offset is determined further based on a measurement gap repetition period, overhead, or both, and wherein the SMTC configuration is SMTC offset, period, or both.

In a ninth aspect, the customized measurement gap length is determined based on a synchronization signal block (SSB) measurement timing configuration (SMTC) configuration.

In a tenth aspect, the SMTC configuration is an SMTC duration.

In an eleventh aspect, the gap length is determined based on a maximum SSB length.

In twelfth aspect, the method further comprises: determining that there is no measurement gap configuration for at least one serving cell of the at least one inter-RAT cell.

In a thirteenth aspect, the method further comprises, prior to determining the customized measurement gap repetition period, transmitting, by the UE, a capabilities message indicating that the UE requests measurement gaps to identify or measure inter-RAT cells.

In a fourteenth aspect, the method further comprises, prior to determining the customized measurement gap repetition period, receiving, by the UE, a configuration message from a networking entity indicating a gapless measurement mode.

In a fifteenth aspect, the method further comprises, prior to determining the customized measurement gap repetition period, receiving, by the UE, a second configuration message from a networking entity indicating a particular gap modification mode.

In a sixteenth aspect, adjusting, by the UE, the SSB measurement gap parameter includes extending the SSB measurement gap parameter, wherein the SSB measurement gap parameter includes a measurement gap length.

In a seventeenth aspect adjusting, by the UE, the SSB measurement gap parameter includes increasing the SSB measurement gap parameter, and wherein the SSB measurement gap parameter includes a measurement gap offset.

In an eighteenth aspect, the at least one inter-RAT cell includes a first serving cell and a second serving cell, wherein the UE is connected the second serving cell, and wherein the first serving cell and a second serving cell are not time aligned.

In a nineteenth aspect, the at least one inter-RAT cell includes a first serving cell and a second serving cell, wherein the UE is connected the second serving cell, wherein a first timing of the first serving cell and a second timing of the second serving cell drift after an alignment of the first serving cell and the second serving cell.

In a twentieth aspect, the at least one inter-RAT cell includes a first serving cell and a second serving cell, and further comprising starting a first timer (T1) responsive to receiving a measurement configuration for the first serving cell.

In a twenty-first aspect, the method further comprises resetting the first timer based on receiving a SSB for the first serving cell.

In a twenty-second aspect, the method further comprises starting a second timer (T2) responsive to receiving a measurement configuration for the first serving cell responsive to expiration of the first timer, wherein the first timer is associated with SSB detection for the first serving cell.

In a twenty-third aspect, the method further comprises starting customized measurement gap length configuration responsive to not detecting a SSB for the first serving cell prior to expiration of the first timer.

In a twenty-fourth aspect, the method further comprises: stopping, by the UE, the second timer based on receiving a SSB for the first serving cell; stopping, by the UE, customized measurement gap length configuration based on receiving the SSB; and sending, by the UE, a measurement report based on receiving the SSB.

In a twenty-fifth aspect, the method further comprises starting customized shift detection responsive to not detecting a SSB for the first serving cell prior to expiration of the first timer.

In a twenty-sixth aspect, the method further comprises: stopping, by the UE, the second timer based on receiving a SSB for the first serving cell; stopping, by the UE, customized shift detection based on receiving the SSB; and sending, by the UE, a measurement report based on receiving the SSB.

In a twenty-seventh aspect, the SSB measurement gap parameter includes a customized measurement gap repartition period, a customized measurement gap offset, a customized measurement gap length, or a combination thereof.

In a twenty-eighth aspect, the customized measurement gap offset comprises a local or device specific measurement gap offset and is different from a network measurement gap offset.

In a twenty-ninth aspect, the method further comprises: responsive to monitoring for the SSBs, performing, by the UE, an inter-RAT measurement; and determining, by the UE, a measurement report based on the measurement configuration and the inter-RAT measurement.

In a thirtieth aspect, the method further comprises: determining, by the UE, a measurement result based on the measurement configuration and the inter-RAT measurement; determining, by the UE, whether one or more measurement reporting conditions are satisfied; and transmitting, by the UE, the measurement report and the measurement result based on determining that the one or more measurement reporting conditions are satisfied.

In a thirty-first aspect, the method further comprises: receiving, by the UE, a radio resource control message indicating synchronization signal block (SSB) measurement timing configuration (SMTC) information; and determining an SMTC period based on the SMTC information.

In a thirty-second aspect, the measurement configuration includes or corresponds to a measurement gap configuration, a synchronization signal block (SSB) measurement timing configuration (SMTC) window configuration, or a combination thereof.

In a thirty-third aspect, determining the measurement configuration includes receiving, by the UE, the measurement configuration from the at least one inter-RAT cell. One or more of the above aspects may be combined with one or more of the other above aspects.

Figure 13:
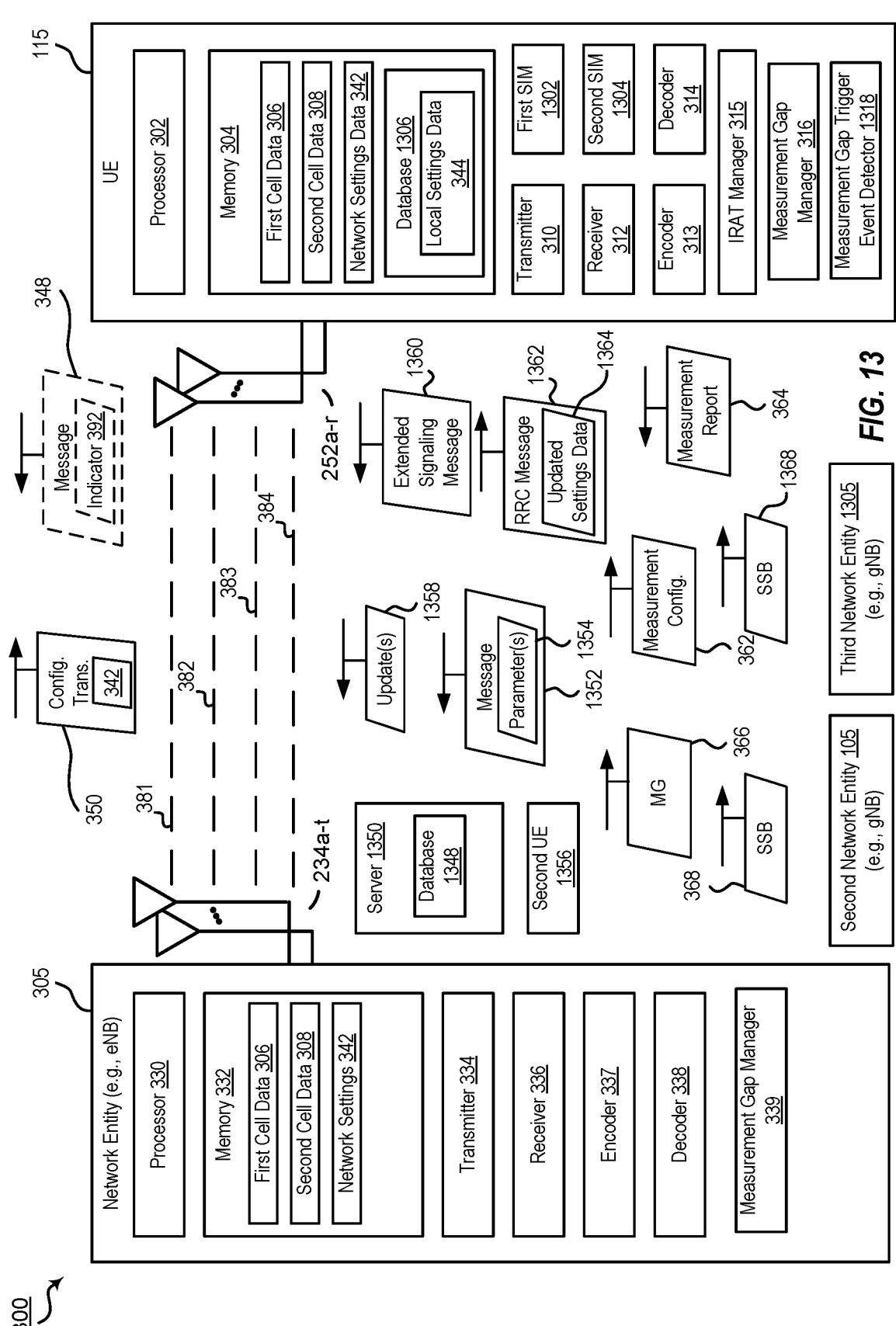
FIG. 13 is a block diagram illustrating another example of a wireless communications system that enables enhanced inter-RAT operations in accordance with aspects of the present disclosure.

FIG. 13 is a diagram illustrating another example of a system 1300 that supports enhanced inter-RAT operations in accordance with aspects of the present disclosure. The system 1300 includes one or more UE devices, such as the UE 115 and a second UE 1356. The system 1300 further includes a plurality of network devices, such as the network entity 305, the second network entity 105, and a third network entity 1305 (e.g., a third base station).

In some examples, the system 1300 further includes one or more servers, such as a server 1350. The server 1350 may be in communication with one or more network devices. In a particular example, the server 1350 is in communication with the network entity 305, the second network entity 105, and the third network entity 1305.

In the example of FIG. 13, the UE 115 includes multiple subscriber identity module (SIM) devices (e.g., SIM cards). The multiple SIM devices may include a first SIM 1302 (e.g., a SIM associated with a first type of network) and a second SIM 1304 (e.g., a SIM associated with a second type of network different than the first type). The example of FIG. 13 also illustrates that the UE 115 includes a measurement gap trigger event detector 1318. In some implementations, the UE 115 optionally includes the measurement gap manager 316 of FIG. 3.

During operation, the system 1300 may perform any of the operations described with reference to FIGS. 1-12. In one example, the UE 115 is configured to communicate with one or more network devices, such as the network entity 305. For example, the UE 115 may detect a wireless signal transmitted by the network entity 305 and may establish wireless communication with the network entity 305 in response the wireless signal. In a particular example, the network entity 305 is associated with a first RAT, and communication between the network entity 305 and the UE 115 is performed based on the first RAT. In a particular example, the first RAT is associated with or corresponds to an LTE communication protocol.

In a particular example, the second network entity 105 is associated with a second RAT. The second RAT may be associated with or may correspond to a 5G NR communication protocol, as an illustrative example.

To enable detection of or communication with the second network entity 105, the UE 115 of FIG. 13 may be configured to determine a customized measurement gap, such as using one or more techniques described with reference to FIGS. 1-12. As a particular example, in some implementations, the customized measurement gap corresponds to the local gap measurement gap described with reference to any of FIGS. 6-9. Alternatively or in addition, the UE 115 may be configured to use a non-local or non-customized measurement gap (e.g., a network-specified measurement gap) for one or more operations described herein.

The UE 115 may be configured to determine the local settings data 344 (e.g., using any technique described with reference to FIG. 3). The local settings data 344 may indicate one or more parameters associated with a customized measurement gap. To illustrate, the local settings data 344 may include a measurement gap repetition period (MGRP) associated with the customized measurement gap, a measurement gap offset (e.g., gapOffset) associated with the customized measurement gap, a measurement gap length (GPL) associated with the customized measurement gap, or a combination thereof. Alternatively or in addition, the local settings data 344 may indicate one or more parameters associated with a measurement gap of the network entity 305, one or more parameters associated with an SMTC window of the second network entity 105, a timing difference between the measurement gap and the SMTC window, or a combination thereof. In some examples, the UE 115 is configured to store the local settings data 344 (or one or more parameters of the local settings data 344) in a database 1306.

In the example of FIG. 13, the UE 115 is configured to monitor for a measurement gap trigger event (e.g., using the measurement gap trigger event detector 1318). The UE 115 may be configured to selectively search for and/or measure SSBs in response to detection of the measurement gap trigger event. In a particular example, in response to detection of the measurement gap trigger event, the UE device 115 tunes the receiver 312 (or another receiver) to receive (e.g., search for and/or measure) the SSB 368 from the second network entity 105. In response to failure to detect the measurement gap trigger event, the UE 115 may avoid searching for and/or measuring SSBs (e.g., by avoiding tuning the receiver 312 to receive the SSB 368). In a particular example, the receiver 312 is tuned to receive signals having a frequency (or a range of frequencies) within a millimeter wave (mmWave) frequency spectrum.

The UE 115 may be configured to monitor for one or more events that correspond to the measurement gap trigger event. In one example, detecting the measurement gap trigger event includes detecting a particular communication mode of the UE 115, such as a connected mode discontinuous reception off (CDRX OFF) mode of operation of the UE 115. To illustrate, in some implementations, the network entity 305 is notified of the CDRX OFF mode and avoids sending data or other messages to the UE 115 during the CDRX OFF mode. In this case, by selectively searching for and/or measuring SSBs based on the CDRX OFF mode of operation, data loss can be avoided (e.g., by avoiding a circumstance in which the network entity 305 sends data via a channel while the receiver 312 is tuned away from the channel).

In a particular example, the UE 115 is configured to perform a determination of whether to schedule measurements during one instance of a CDRX cycle (e.g., CDRX OFF and CDRX ON) or during multiple instances of the CDRX cycle (e.g., where the UE 115 wakes up from the CDRX OFF mode to monitor for messages and then reenters the CDRX OFF mode). The UE 115 may be configured to perform the determination based on a duration of the CDRX OFF mode (e.g., a number of milliseconds (ms) or clock cycles from beginning the CDRX OFF mode until terminating the CDRX OFF mode), a number of the multiple measurements to be performed, or both. To illustrate, if the duration of the CDRX OFF mode is relatively short (e.g., the duration fails to satisfy a first threshold) and/or the number of the measurements is relatively large (e.g., the number satisfies a second threshold), then the multiple measurements may be "spread out" (e.g., allocated) among multiple instances of the CDRX OFF mode (e.g., during multiple CDRX cycles). Alternatively, if the duration of the CDRX mode OFF is relatively long (e.g., the duration satisfies the first threshold) and/or the number of the measurements is relatively small (e.g., the number fails to satisfy the second threshold), then the multiple measurements may performed in one instance of the CDRX OFF mode (e.g., during a CDRX OFF mode of a single CDRX cycle).

In some examples, the UE 115 includes a control register configured to store a bit (e.g., a flag). A value of the bit may indicate whether the UE 115 is operating according to the CDRX OFF mode (e.g., where a first value of the bit indicates that the UE 115 is operating according to the CDRX OFF mode, and where a second value of the bit indicates that the UE 115 is not operating according CDRX OFF mode). The measurement gap trigger event detector 1318 may be configured to monitor for the measurement gap trigger event by querying the control register to determine the value of the bit. In another example, the processor 302 may be configured to initiate the CDRX OFF mode and to send a control signal to the measurement gap trigger event detector 1318 indicating initiation of the CDRX mode.

Alternatively or in addition, the measurement gap trigger event detector 1318 may be configured to monitor for a tune-away event from the first SIM 1302 to the second SIM 1304. In some devices, tune-away from one SIM to another SIM may be associated with momentary service interruption or data loss. For example, one or more data packets may be lost while operation is transitioned between SIMS. In some cases, use of a data repetition technique (e.g., a hybrid automatic repeat request (HARQ) technique) may be insufficient to recover the one or more data packets (e.g., due to a "hangover" period associated with certain SIM transitions). In a particular example, the UE 115 is configured to detect a tune-away event (e.g., from the first SIM 1302 to the second SIM 1304) and to determine whether a guard time interval has expired since detecting the tune-away event. Use of the guard time interval may avoid data loss due to a "hangover" period associated with the tune-away event. In this example, detecting the measurement gap trigger event may include detecting expiration of the guard time interval after the tune-away event.

In some implementations, the measurement gap trigger event detector 1318 is configured to monitor one or more buses (e.g., one or more data buses, one or more control buses, or one or more other buses) coupled to the first SIM 1302, to the second SIM 1304, or both. For example, the measurement gap trigger event detector 1318 may be configured to monitor the one or more buses to detect whether the first SIM 1302 or the second SIM 1304 is active. In this example, monitoring for the measurement gap trigger event includes monitoring the one or more buses.

Alternatively or in addition, detecting the measurement gap trigger event may include detecting termination of a high priority event of the UE. To illustrate, in some implementations, searching for and/or measuring SSBs may be disabled by the UE 115 during the high priority event. As a particular example, the high priority event may include a voice over Long-Term Evolution (VoLTE) call performed by the UE device 115 with the network entity 305, and searching for and/or measuring SSBs may be disabled during the VoLTE call (e.g., to reduce or avoid loss of one or more data packets associated with the VoLTE call, or to reduce or avoid clipping or other sound artifacts during the VoLTE call). In this example, detecting the measurement gap trigger event may include detecting termination of the high priority event (e.g., by detecting termination of the VoLTE call).

In some implementations, the measurement gap trigger event detector 1318 is configured to monitor a transmitter bus associated with the transmitter 310, a receiver bus associated with the receiver 312, or a combination thereof. Monitoring for the measurement gap trigger event may include monitoring the transmitter bus to detect a data transmission, monitoring the receiver bus to detect data reception, or a combination thereof. The measurement gap trigger event detector 1318 may be configured to detect a high priority event based on the data transmission, the data reception, or both.

Upon detecting a measurement gap trigger event, the UE 115 may tune the receiver 312 (or another receiver) to receive one or more SSBs. For example, the one or more SSBs may include the SSB 368 from the second network entity 105. In some examples, the UE 115 optionally tunes the receiver 312 at a time associated with a customized measurement gap (e.g., a particular clock cycle when the customized measurement gap begins).

In some examples, the UE 115 uses the SSB 368 to facilitate communications with the second network entity 105, such as by determining whether to establish communications with the second network entity 105 (e.g., based on a signal strength of the SSB 368), by synchronizing timing with the second network entity 105 (e.g., based on a primary or secondary synchronization signal included in the SSB 368), by performing one or more other operations, or a combination thereof. The UE device 115 may periodically "listen" for one or more additional SSBs from the second network entity 105 (e.g., to resynchronize timing with the second network entity 105) based on a schedule of the customized measurement gap indicated by the local settings data 344.

In some circumstances, the UE 115 may receive a plurality of SSBs from a plurality of network devices during a particular SSB receive operation. As an example, the UE 115 may receive the SSB 368 from the second network entity 105 and an SSB 1368 from the third network entity 1305. In some implementations, the UE 115 is configured to select a particular network device (e.g., the second network entity 105) from among the plurality of network devices based on a comparison of the plurality of SSBs. For example, the UE 115 may be configured to communicate with a particular network device (e.g., the second network entity 105) having an SSB with the greatest signal strength (e.g., signal-to-noise ratio (SNR)) among the plurality of network devices.

In one example, the plurality of network devices are asynchronous (e.g., where signal timing of one or more of the plurality of network devices differs from signal timing of one or more others of the plurality of network devices). In this case, instead of creating one or more customized measurement gaps that enable SSB reception from multiple network devices of the plurality of network devices, the UE 115 may select the particular network device of the plurality of network devices and may create a customized measurement gap to receive SSBs from the particular network device. As an illustrative example, the customized measurement gap may enable the UE 115 to receive the SSB 368 from the second network entity 105 but not the SSB 1368 from the third network entity 1305.

In some implementations, the UE 115 is configured to update the local settings data 344 to indicate one or more parameters based on the SSB 368, the SSB 1368, or both. For example, the UE 115 may update the local settings data 344 to indicate timing (e.g., an SMTC window) of the second network entity 105 based on the SSB 368.

The UE 115 may be configured to determine (e.g., based on a periodic schedule) whether to maintain or release (e.g., invalidate, delete, or overwrite) one or more parameters of the local settings data 344. In one example, the UE device 115 is configured to release one or more parameters of the local settings data 344 in response to detecting an idle mode of the UE device 115, such as a radio resource control (RRC) idle (RRC_IDLE) mode associated with a 5G NR communication protocol. To illustrate, if the UE 115 leaves a coverage area associated with the second network entity 105, the UE 115 may cease communications with the second network entity 105 and may enter the RRC_IDLE mode. Because one or more parameters indicated by the local settings data 344 may be specific to timing (e.g., an SMTC window) of the second network entity 105, the UE 115 may release the one or more parameters of the local settings data 344 from the database 1306 upon ceasing to communicate with the second network entity 105 and entering the RRCIIDLE mode.

Alternatively or in addition, the UE 115 may be configured to release one or more parameters of the local settings data 344 in response to detecting expiration of a threshold time interval since receiving the SSB 368. For example, the UE 115 may determine, upon expiration of the threshold time interval, that timing indicated by the local settings data 344 is likely to be "stale" (e.g., due to clock drift associated with the second network entity 105, the UE 115, or both). In this case, the UE 115 may release one or more parameters of the local settings data 344 in response to detecting expiration of the threshold time interval since receiving the SSB 368.

Alternatively or in addition, the UE 115 may be configured to release one or more parameters of the local settings data 344 in response to terminating communication with the network entity 305. For example, in some circumstances, a handover from the network entity 305 to another network device may be performed. As another example, a radio link failure may occur with respect to the network entity 305, and communications may be reestablished with another network device (instead of the network entity 305). Because the customized measurement gap may be specific to timing of the network entity 305, the UE 115 may release the local settings data 344 from the database 1306 upon ceasing to communicate with the network entity 305.

In some examples, the UE 115 is configured to send a message 1352 to the server 1350. The message 1352 may indicate one or more parameters 1354 of the local settings data 344. In a particular example, sending the message 1352 to the server 1350 enables the server 1350 to share the one or more parameters with one or more other UE devices.

To illustrate, the one or more parameters 1354 may indicate one or more parameters of a customized measurement gap determined by the UE 115. Upon detecting that the second UE 1356 is in communication with the network entity 305 and the second network entity 105 (e.g., based on network data sent to the server 1350 by the network entity 305 and the second network entity 105), the server 1350 may send the one or more parameters 1354 to the second UE 1356 to enable the second UE 1356 to use the customized measurement gap to search for and/or measure one or more SSBs. As a result, the second UE 1356 may avoid performing (or reduce a number of) operations to determine a customized measurement gap.

To further illustrate, in some examples, the server 1350 is configured to store a database 1348 and to add, based on the one or more parameters 1354, information to the database 1348 indicating timing parameters for a plurality of network devices (e.g., the network entity 305, the second network entity 105, and the third network entity 1305). The server 1350 may be configured to determine, based on the information of the database 1348, a measurement gap to be used by the second UE 1356 to receive one or more SSBs from a particular network device of the plurality of network devices, such as the second network entity 105. The server 1350 may be configured to send, to the second UE 1356, an indication of the measurement gap.

The UE 115 may periodically send one or more updates 1358 of the local settings data 344 to the server 1350. For example, in response to releasing the local settings data 344 from the database 1306, the UE 115 may indicate (e.g., via the one or more updates 1358) that the one or more parameters 1354 may no longer be valid. Alternatively or in addition, the UE 115 may perform a modification of the local settings data 344 (e.g., after resynchronizing timing with the network entity 305 or the second network entity 105) and may indicate the modification to the server 1350 via the one or more updates 1358. In some cases, the one or more updates 1358 indicate failure of the UE device 115 to receive an SSB during a particular threshold time interval or reception of another SSB from another network device different than the second network device (e.g., reception of the SSB 1368 from the third network entity 1305).

In some examples, the server 1350 is configured to update information of the database 1348 in response to the one or more updates 1358. The server 1350 may be configured to send, to the second UE 1356, an indication of an updated measurement gap in response to updating the information of the database 1348.

Alternatively or in addition, in some examples, the UE 115 is configured to send an extended signaling message 1360 to a particular network device, such as the network entity 305, the second network entity 105, or the server 1350. In a particular example, the extended signaling message 1360 indicates one or more of a synchronization difference (e.g., a frame timing difference) between the network entity 305 and the second network entity 105 or a timing offset between a measurement gap of the network entity 305 and an SMTC window of the second network entity 105. The synchronization difference may indicate a system frame number (SFN) offset between frames of the network entity 305 and the second network entity 105, a frame timing difference between frames of the network entity 305 and the second network entity 105, a frame boundary offset between frames of the network entity 305 and the second network entity 105, one or more other parameters, or a combination thereof.

In some examples, transmission of the extended signaling message 1360 complies with some (but not all) aspects of a particular communication protocol, such as a 5G NR communication protocol. To illustrate, one or more aspects of the extended signaling message 1360 may correspond to an SFN and frame timing difference (SFTD) measurement message specified by a 5G NR communication protocol. The 5G NR communication protocol may specify that a network device can request a UE to measure the SFTD and report the measured SFTD to a network device. In a particular example, the UE 115 is configured to autonomously (or unilaterally) initiate sending of the extended signaling message 1360 to the particular network device (e.g., without receiving a request for the extended signaling message 1360).

In some examples, the particular network device adjusts one or more timing parameters based on the extended signaling message 1360. For example, in response to receiving the extended signaling message 1360, the network entity 305 may adjust a timing offset associated with the measurement gap of the network entity 305. As another example, in response to receiving the extended signaling message 1360, the second network entity 105 may adjust a timing offset associated with the SMTC window of the second network entity 105. In some cases, the particular network device is configured to initiate, in response to the extended signaling message 1360, a timing offset handshake between the network entity 305 and the second network entity 105 (e.g., to move one or more of the measurement gap or the SMTC window so that the measurement gap overlaps the SMTC window).

In response to adjusting the one or more timing parameters, the particular network device may be configured to send, to the UE device 115, updated settings data 1364 for the customized measurement gap. For example, the updated settings data 1364 may indicate an adjustment to a timing offset associated with the measurement gap of the network entity 305. As another example, the updated settings data 1364 may indicate an adjustment to a timing offset associated with the SMTC window of the second network entity 105. The UE 115 may be configured to modify the local settings data 344 based on the updated settings data 1364 (e.g., by aligning the customized measurement gap with the adjusted measurement gap or with the adjusted SMTC window). In the example of FIG. 13, the particular network device sends the updated settings data 1364 to the UE 115 via a reconfiguration message, such as a radio resource control (RRC) reconfiguration message 1362.

In some examples, the updated settings data 1364 includes one or more dual connectivity parameters for communication using the network entity 305 as a primary node and using the second network entity 105 as a secondary node. For example, the updated settings data 1364 may include evolved Universal Mobile Telecommunications Service (UMTS) terrestrial radio access (E-UTRA) new-radio dual connectivity (ENDC) parameters that are updated in response to the extended signaling message 1360.

It is noted that the UE 115 is configured to perform operations described herein on an inter-RAT (IRAT) basis. For example, communicating with the network entity 305 may include registering with the network entity 305, and determining the local settings data 344, detecting the measurement gap trigger event, and the tuning the receiver 312 may be performed while the UE 115 is registered with the network entity 305. Thus, although certain operations have been described separately for convenience, such operations can be performed concurrently (e.g., on an IRAT basis).

One or more aspects described with reference to FIG. 13 improve operation of a communication system, such as the system 1300. As an example, by identifying one or more trigger conditions detected by the measurement gap trigger event detector 1318, SSB searches and/or measurement can be selectively performed, which may reduce or avoid interruption of other operations of the UE 115, such as communications with the network entity 305.

Figure 14:
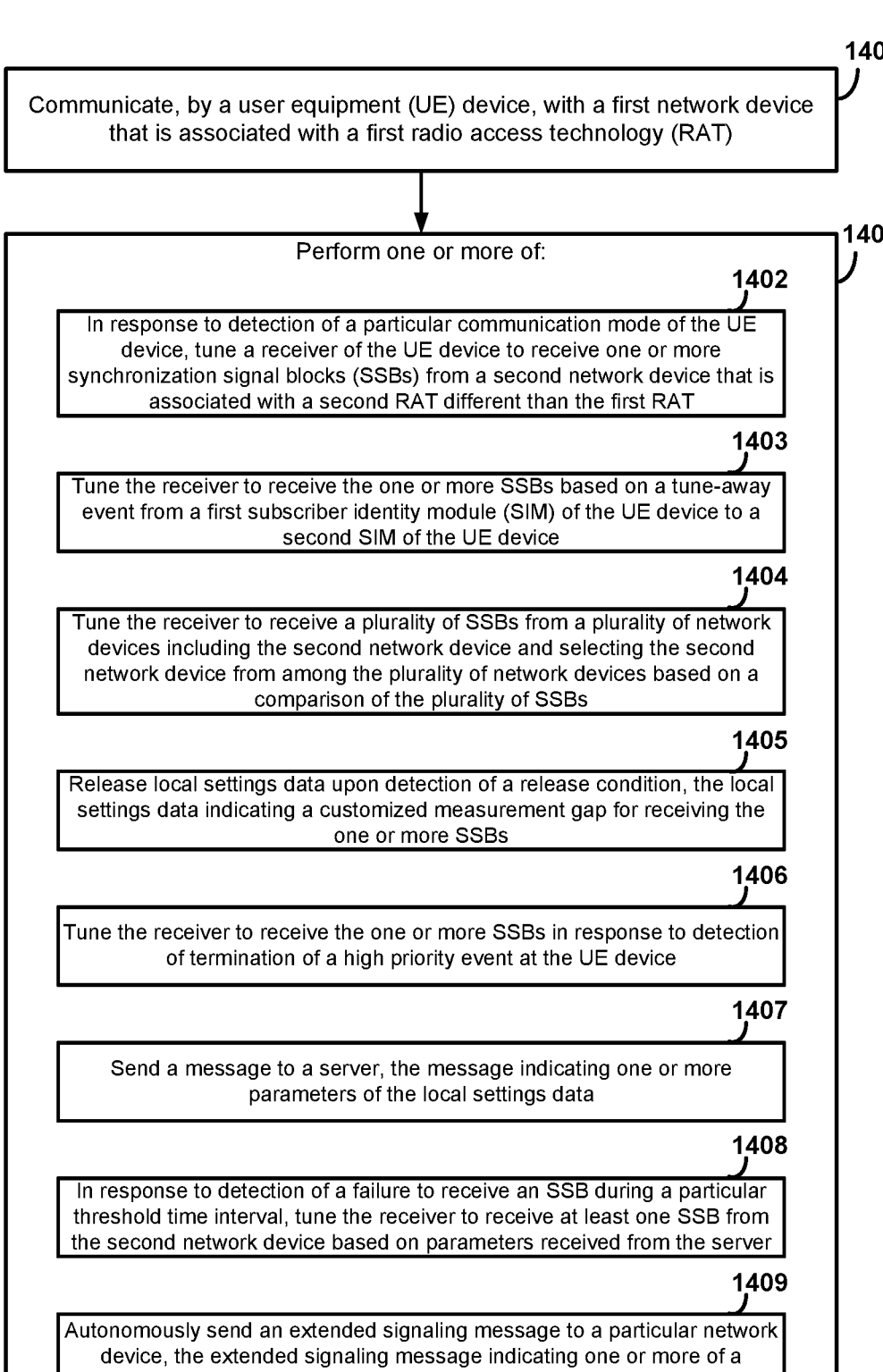
FIG. 14 is a flow diagram illustrating example blocks executed by a UE configured according to an aspect of the present disclosure.

FIG. 14 is a flow diagram illustrating example blocks executed by a UE configured according to an aspect of the present disclosure. In some examples, operations of the method of FIG. 14 are performed by the UE 115, by the second UE 1356, or by another UE, as illustrative examples.

At block 1400, a UE device communicates with a first network device that is associated with a first radio access technology (RAT). For example, the UE 115 may communicate with the network entity 305 using wireless radios 1200*a-r* and antennas 252*a-r*. The UE 115 may execute, under control of controller/processor 280, instructions stored in memory 282.

At block 1401, the UE device performs one or more operations, such as one or more operations that enhance IRAT communication. The one or more operations may include tuning a receiver of the UE device, in response to detection of a particular communication mode of the UE device, to receive one or more synchronization signal blocks (SSBs) from a second network device that is associated with a second RAT different than the first RAT, at block 1402. As an example, the UE 115 may be configured to tune the receiver 312 to receive the SSB 368 from the second network entity 105 in response to a particular communication mode of the UE device 115.

Alternatively or in addition, the one or more operations include tuning the receiver to receive the one or more SSBs based on a tune-away event from a first subscriber identity module (SIM) of the UE device to a second SIM of the UE device, at block 1403. As an example, the UE 115 may be configured to tune the receiver 312 at a time that is based on a tune-away event from the first SIM 1302 to the second SIM 1304 (or from a retuning event from the second SIM 1304 to the first SIM 1302).

Alternatively or in addition, the one or more operations include tuning the receiver to receive a plurality of SSBs from a plurality of network devices including the second network device and selecting the second network device from among the plurality of network devices based on a comparison of the plurality of SSBs, at block 1404. As an example, the UE 115 may be configured to receive the SSBs 368, 1368 and to perform a comparison of the SSBs 368, 1368.

Alternatively or in addition, the one or more operations include releasing local settings data upon detection of a release condition, the local settings data indicating a customized measurement gap for receiving the one or more SSBs at block 1405. As an example, the UE 115 may be configured to determine whether to release the local settings data 344 from the database 1306.

Alternatively or in addition, the one or more operations include tuning the receiver to receive the one or more SSBs in response to detection of termination of a high priority event at the UE device at block 1406. As an example, the UE 115 may be configured to detect termination of a high priority event at the UE 115, such as termination of a VoLTE call, as an illustrative example.

Alternatively or in addition, the one or more operations include sending a message to a server, the message indicating one or more parameters of the local settings data at block 1407. As an example, the UE 115 may be configured to send the message 1352 to the server 1350, and the message 1352 may indicate the one or more parameters 1354.

Alternatively or in addition, the one or more operations include tuning the receiver, in response to detection of a failure to receive an SSB during a particular threshold time interval, to receive at least one SSB from the second network device based on parameters received from the server, at block 1408. For example, in some instances, searching for the SSB 368 based on parameters of the local settings data 344 (e.g., based on a particular customized measurement gap indicated by the local settings data 344) may not result in SSB reception. In this case, the UE 115 may be configured to detect the failure to receive an SSB. The UE 115 may be configured to use one or more parameters received from the server 1350 (e.g., a network-specified measurement gap) instead of the one or more parameters indicated by the local settings data 344 to receive the SSB 368 from the second network entity 105.

Alternatively or in addition, the one or more operations include autonomously sending an extended signaling message to a particular network device, at block 1409. The extended signaling message indicates one or more of a synchronization difference between the first network device and the second network device or a timing offset between a measurement gap of the first network device and an SMTC window of the second network device. As an example, the UE 115 may be configured to send the extended signaling message 1360 to the network entity 305, to the second network entity 105, to the third network entity 1305, to the server 1350, to one or more other devices, or a combination thereof.

In a first aspect, the particular communication mode is a connected mode discontinuous reception off (CDRX OFF) mode of operation.

In a second aspect, the method of FIG. 14 further includes determining whether to perform multiple measurements during the particular communication mode based on one or more of a duration of operating in the particular communication mode or a number of the multiple measurements to be performed.

In a third aspect, tuning the receiver is performed in response to detection of expiration of a guard time interval after the tune-away event.

In a fourth aspect, releasing the local settings data is performed in response to detecting an idle mode of the UE device.

In a fifth aspect, releasing the local settings data is performed in response to detecting expiration of a threshold time interval since receiving the one or more SSBs.

In a sixth aspect, releasing the local settings data is performed in response to terminating communication with the first network device.

In a seventh aspect, the method of FIG. 14 further includes periodically sending one or more updates of the local settings data to the server. As an example, the UE 115 may be configured to send the one or more updates 1358 of the local settings data 344 to the server 1350.

In an eighth aspect, the method of FIG. 14 further includes receiving, in response to the extended signaling message and from the particular network device, one or more updated parameters for the customized measurement gap. As an example, the UE 115 may be configured to receive the updated settings data 1364.

In a ninth aspect, the UE device autonomously initiates sending the extended signaling message to the particular network device without receiving a request for the extended signaling message.

In a tenth aspect, an apparatus for inter-radio access technology (IRAT) communication includes at least one processor and a memory coupled to the at least one processor. The at least one processor is configured to initiate communications with a first network device that is associated with a first radio access technology (RAT). The at least one processor is further configured to perform one or more of: in response to detection of a particular communication mode, tune a receiver to receive one or more synchronization signal blocks (SSBs) from a second network device that is associated with a second RAT different than the first RAT; tune the receiver to receive the one or more SSBs based on a tune-away event from a first subscriber identity module (SIM) to a second SIM; tune the receiver to receive a plurality of SSBs from a plurality of network devices including the second network device and select the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event; initiate transmission of a message to a server, the message indicating one or more parameters of the local settings data; in response to detection of a failure to receive an SSB during a particular threshold time interval, tune the receiver to receive at least one SSB from the second network device based on parameters received from the server; or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In an eleventh aspect, a non-transitory computer-readable medium has program code recorded thereon. The program code includes program code executable by a user equipment (UE) device for causing the UE device to communicate with a first network device that is associated with a first radio access technology (RAT). The program code further includes program code executable by the UE device for causing the UE device to perform one or more of: in response to detection of a particular communication mode of the UE device, tune a receiver of the UE device to receive one or more synchronization signal blocks (SSBs) from a second network device that is associated with a second RAT different than the first RAT; tune the receiver to receive the one or more SSBs based on a tune-away event from a first subscriber identity module (SIM) of the UE device to a second SIM of the UE device; tune the receiver to receive a plurality of SSBs from a plurality of network devices including the second network device and selecting the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event at the UE device; send a message to a server, the message indicating one or more parameters of the local settings data; in response to detection of a failure to receive an SSB during a particular threshold time interval, tune the receiver to receive at least one SSB from the second network device based on parameters received from the server; or autonomously send an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In a twelfth aspect, an apparatus for inter-radio access technology (IRAT) communication includes means for storing instructions (e.g., the memory 304). The apparatus further includes means for executing the instructions (e.g., the processor 302) to initiate communications with a first network device that is associated with a first radio access technology (RAT) and to perform one or more of: in response to detection of a particular communication mode, tune a receiver to receive one or more synchronization signal blocks (SSBs) from a second network device that is associated with a second RAT different than the first RAT; tune the receiver to receive the one or more SSBs based on a tune-away event from a first subscriber identity module (SIM) to a second SIM; tune the receiver to receive a plurality of SSBs from a plurality of network devices including the second network device and select the second network device from among the plurality of network devices based on a comparison of the plurality of SSBs; release local settings data upon detection of a release condition, the local settings data indicating a customized measurement gap for receiving the one or more SSBs; tune the receiver to receive the one or more SSBs in response to detection of termination of a high priority event; initiate transmission of a message to a server, the message indicating one or more parameters of the local settings data; in response to detection of a failure to receive an SSB during a particular threshold time interval, tune the receiver to receive at least one SSB from the second network device based on parameters received from the server; or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

In a thirteenth aspect, a method of server operation includes receiving, at a server, a message from a first UE device (e.g., the UE 115). The message indicates one or more parameters of local settings data determined by the first UE device. The method further includes adding, by the server, information to a database based on the one or more parameters, the information indicating timing parameters for a plurality of network devices. The method further includes determining, based on the information of the database, a measurement gap to be used by at least a second UE device (e.g., the second UE 1356) to receive one or more synchronization signal blocks (SSBs) from a particular network device (e.g., the second network entity 105) of the plurality of network devices. The method further includes sending, to the second UE device, an indication of the measurement gap.

In a fourteenth aspect, the method further includes receiving, by the server and from the first UE device, one or more updates of the local settings data, updating the information of the database in response to the one or more updates, and sending, to the second UE device, a third message indicating an updated measurement gap in response to updating the information of the database.

In a fifteenth aspect, a method of operation of a network device includes receiving, at a particular network device (e.g., the network entity 305, the second network entity 105, the third network entity 1305, or the server 1350), an extended signaling message indicating one or more of a synchronization difference between a first network device and a second network device or a timing offset between a measurement gap of the first network device and an SMTC window of the second network device. The method further includes sending to a user equipment (UE) device based on the extended signaling message, a reconfiguration message indicating updated settings data for the second network device.

In an sixteenth aspect, the reconfiguration message is a radio resource control (RRC) reconfiguration message.

In a seventeenth aspect, the updated settings data includes one or more dual connectivity parameters for communication using a first network device as a primary node and using a second network device as a secondary node.

In an eighteenth aspect, a method of inter-radio access technology (IRAT) communication includes communicating, by a user equipment (UE) device, with a first network device that is associated with a first radio access technology (RAT). The method further includes, in response to detection of a particular communication mode of the UE device, tuning a receiver of the UE device to receive one or more synchronization signal blocks (SSBs) from a second network device that is associated with a second RAT different than the first RAT.

In a nineteenth aspect, the particular communication mode is a connected mode discontinuous reception off (CDRX OFF) mode of operation.

In a twentieth aspect, the method further includes determining whether to perform multiple measurements during the particular communication mode based on one or more of a duration of operating in the particular communication mode or a number of the multiple measurements to be performed.

In a twenty-first aspect, a method of inter-radio access technology (IRAT) communication includes communicating, by a user equipment (UE) device, with a first network device that is associated with a first radio access technology (RAT). The method further includes, based on a tune-away event from a first subscriber identity module (SIM) of the UE device to a second SIM of the UE device, tuning a receiver of the UE device to receive one or more synchronization signal blocks (SSBs) from a second network device that is associated with a second RAT different than the first RAT.

In a twenty-second aspect, tuning the receiver is performed in response to detection of expiration of a guard time interval after the tune-away event.

In a twenty-third aspect, a method of inter-radio access technology (IRAT) communication includes communicating, by a user equipment (UE) device, with a first network device that is associated with a first radio access technology (RAT). The method further includes tuning a receiver of the UE device to receive a plurality of synchronization signal blocks (SSBs) from a plurality of network devices including a second network device. The second network device is associated with a second RAT different than the first RAT. The method further includes selecting the second network device from among the plurality of network devices based on a comparison of the plurality of SSBs.

In a twenty-fourth aspect, a method of inter-radio access technology (IRAT) communication includes communicating, by a user equipment (UE) device, with a first network device that is associated with a first radio access technology (RAT). The method further includes releasing local settings data upon detection of a release condition, the local settings data indicating a customized measurement gap for receiving one or more synchronization signal blocks (SSBs) from a second network device that is associated with a second RAT different than the first RAT.

In a twenty-fifth aspect, releasing the local settings data is performed in response to detecting an idle mode of the UE device.

In a twenty-sixth aspect, releasing the local settings data is performed in response to detecting expiration of a threshold time interval since receiving the one or more SSBs.

In a twenty-seventh aspect, releasing the local settings data is performed in response to terminating communication with the first network device.

In a twenty-eighth aspect, a method of inter-radio access technology (IRAT) communication includes communicating, by a user equipment (UE) device, with a first network device that is associated with a first radio access technology (RAT). The method further includes, in response to detection of termination of a high priority event at the UE device, tuning a receiver of the UE device to receive one or more synchronization signal blocks (SSBs) from a second network device that is associated with a second RAT different than the first RAT.

In a twenty-ninth aspect, a method of inter-radio access technology (IRAT) communication includes communicating, by a user equipment (UE) device, with a first network device that is associated with a first radio access technology (RAT). The method further includes sending a message to a server, the message indicating one or more parameters of local settings data, the local settings data indicating a customized measurement gap for receiving one or more synchronization signal blocks (SSBs) from a second network device that is associated with a second RAT different than the first RAT. The method further includes, in response to detection of a failure to receive an SSB during a particular threshold time interval, tuning a receiver of the UE device to receive at least one SSB from the second network device based on parameters received from the server.

In a thirtieth aspect, the method further includes periodically sending one or more updates of the local settings data to the server.

In a thirty-first aspect, a method of inter-radio access technology (IRAT) communication includes communicating, by a user equipment (UE) device, with a first network device that is associated with a first radio access technology (RAT). The method further includes autonomously sending an extended signaling message to a particular network device. The extended signaling message indicates one or more of a synchronization difference between the first network device and a second network device or a timing offset between a measurement gap of the first network device and an SSB based measurement timing configuration (SMTC) window of the second network device, the second network device associated with a second RAT different than the first RAT.

In a thirty-second aspect, the method further includes receiving, in response to the extended signaling message and from the particular network device, one or more updated parameters for the measurement gap.

In a thirty-third aspect, the UE device autonomously initiates sending the extended signaling message to the particular network device without receiving a request for the extended signaling message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to inter-RAT and measurement gap operations may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 10, 11, and 14) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

A method to increase 5G cell add successful rate

Appendix

Background Description

• In NSA 5G network, UE performs L2NR IRAT measurement according to network measurement gap configuration and report measurement report to add SCG cell if conditions are satisfied.

• It's expected that the network would align the SMTC window with measurement gap at LTE, which would guarantee UE's L-to-NR measurement on valid NR SSB.

• In practice, network may

1. No measurement gap configured, or 2. wrong measurement gap due to misaligned timing between LTE eNB and NR gNB, or 3. Wrong measurement gap due to wrong offsets between meas gap offset and SMTC offset, although LTE eNB and NR gNB timing are aligned.

Therefore, no SCG addition may happen if UE purely follows network configuration on measurement.

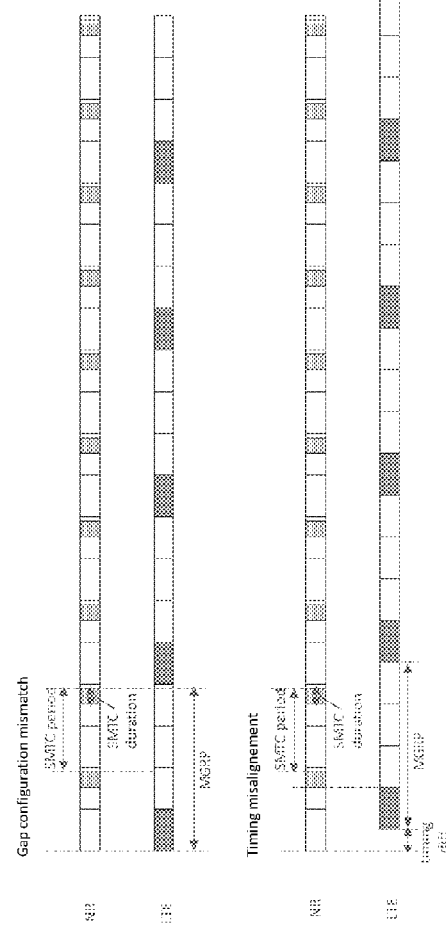

Illustration for wrong meas gap config due to misaligned timing or wrong offset config

Proposals

* The target scenarios and the proposed solutions include

1. No measurement gap configuration
   a) Concurrent LTE Tx/Rx and NR measurements
   b) Sequential LTE Tx/Rx and NR measurements The two methods above could be switched/chosen based on UE hardware capability.

2. Wrong measurement gap configuration
   a) Local gap length (GPL) extension for NR measurements
   b) Local gap offset shifting for NR measurements The two local gap methods could be switched based on UE traffic type/priority, scheduling rate, etc.

Proposal on NO MeasGap

* If NO measurement gap configuration, UE may perform concurrent NR measurement while LTE Tx/Rx if hardware supports (gapless measurement capable).

* If there is any hardware limitation to perform concurrent NR measurement, UE could fake a measurement gap with
  * Preferred MGRP: $MGRP_{local}$
    o $MGRP_{local}$ could be set based on UE's capability, current active traffic type or scheduling rates.
    For example, UE could set MGRP_local to a large value (160ms+) during active VoLTE call or other high priority data session. UE could also set a short MGRP like 40ms if less traffic activities on LTE (e.g. before PS traffic start).

* Gap offset based on SMTC configuration: $gapOffset_{local}$
  $$gapOffset_{local} = floor(MGRP_{local} - overhead + SMTC\_offset) \, mod \, SMTC\_period$$
  Where, overhead is the hardware overhead set by UE according to it's (RF/HW) capability.

* Gap length: $GPL_{local}$
    o UE may set GPL according to SMTC duration or maximum SSB length (5ms)

* UE would follow the local measGap by {$MGRP_{local}$, $gapOffset_{local}$, $GPL_{local}$} above to perform L2NR IRAT measurement.

* UE would view the local meas gap as the same as MSIM tune-away gaps and trigger MSIM protections.

Proposal #1 on Wrong MeasGap

• The proposal is to conditionally extend the measurement gap length (MGL) to detect NR SSB in a best effort way if UE fails to detect NR cell in configured measurement gap for certain period.

• Proposal
   ○ MCG LTE starts timer T1 upon getting measurement configuration for NR cell:
      • Upon T1 expiration, if no SSB detected in configured SMTC window
         – MCG LTE starts timer T2
         – Apply local MGL_local = SMTC_period or other length
         – Perform L2NR IRAT meas according to $\{MGRP_{nw}, gapOffset_{nw}, GPL_{local}\}$
         – If SSB detected
            ▪ Stop T2;
            ▪ Stop local MGL configuration;
            ▪ Sent measurement report;
      • Upon expiration of T2, stop local MGL configure
   ○ UE would view the local meas gap with GPL_local as the same as MSIM tune-away gaps and trigger MSIM protections.

Solution Proposal

Legend:
- NR SMTC
- LTE Measurement Gap
- LTE Measurement Gap by NW config

NR
LTE
LTE Local gap

SMTC period
SMTC duration
MGL
MGRP
MGL_local

NR
LTE
LTE Local gap

SMTC period
SMTC duration
MGRP
timing diff
MGL_local

Illustration
Assuming SMTC period=10ms, GPL_local =10ms

• Although the proposal may introduce some BLER on LTE, the impact is limited to certain period (T2) during local shift detection. And may be relieved by MSIM tune-away gap protection algorithms.

Proposal #2 on Wrong MeasGap

* The proposal is to conditionally shift the measurement gap offset to detect NR SSB in a best effort way if UE fails to detect NR cell in configured measurement gap for certain period.

* Proposal
  * MCG LTE starts timer T1 upon getting measurement configuration for NR cell:
    – Upon T1 expiration, if no SSB detected in SMTC window
    – MCG LTE starts timer T2
    – Calculate the maximum number of local shift position $N = SMTC\ period/\Delta$ [1]
    – From $n = 1$
      ○ shift the configured measurement gap offset with $\Delta$, viz.
      $$offset(n+1) = mod(offset(n) + \Delta, measGapPeriod)$$
      Where, $offset(1) = configured\ offset$
      ○ If no SSB detected in consecutive $M$ [2] measurement gaps, increment n and try the next shift;
      ○ If SSB detected with current of $offset(n+1)$,
        ▪ Stop T2;
        ▪ Stop local shift detection;
        ▪ Sent measurement report;
  * Upon expiration of T2, stop local shift detection
  * UE would view the local meas gap with GPL_local as the same as MSIM tune-away gaps and trigger MSIM protections.

[Note 1] Δ is the step size of local offset shift, e.g. Δ =5ms and the max number of local shift N is to cover the whole SSB period.
[Note 2] Shift to next position after consecutive M measurement gap to improve the detection reliability, e.g. M=3.

Solution Proposal
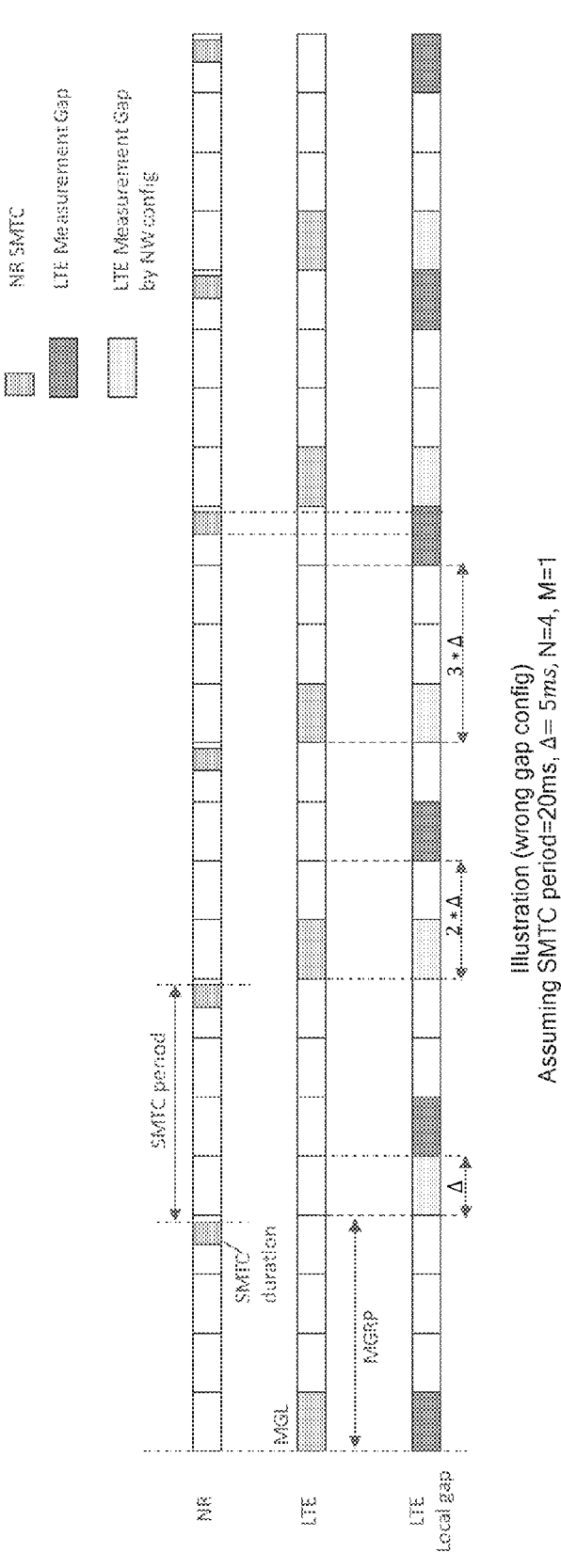
Illustration (wrong gap config)
Assuming SMTC period=20ms, Δ= 5ms, N=4, M=1
Similar for wrong gap due to timing misalignment
- Although the proposal may introduce some BLER on LTE, the impact is limited to certain period (T2) during local shift detection. And may be relieved by MSIM tune-away gap protection algorithms.

Additional Proposals

* 1. Local gap scheduling during CDRX OFF
  ◦ For both no gap or wrong gap case, UE could schedule measurement in local gap with GPL_local during CDRX OFF.
  ◦ Based on available CDRX OFF length and number of NR measurement, UE could schedule multiple measurements in one CDRX or multiple CDRX.

* 2. Local gap scheduling in Multi-SIM device
  ◦ For multi-SIM device, guard time is set to avoid close Tx/Rx interruptions due to local gap and MSIM gap and local gap is scheduled only when the interval is more than the guard time.

* 3. Local gap parameters consideration for multiple NR
  ◦ For multiple NR cells with different SSB configurations, UE could record the detected SSB configuration and corresponding local gap offset. UE could further select one local gap based on SSB quality.

Additional Proposals

- 4. Local gap parameters release condition
  - UE enters RRC_IDLE
  - When the last cell detection/measurement is older than T_stale seconds.
  - Upon cell change due to HO/Re-establishment

- 5. Local gap measurement enable/disable
  - The local gap measurement could be enabled or disabled based on UE traffic type/priority, scheduling rate, etc. For example, it can be disabled during high priority session (VoLTE call) on LTE and enabled after high priority session end.

- 6. Server assisted measurement gap configuration
  - Database to keep/update the correct gap configuration based on LTE & NR cell PLMN/CPI/frequency/location?
  - UE updates gap configuration from server periodically and conditionally apply the gap config in database, such as no SSB detected after several measurements
  - UE sends the updated gap configuration after SSB detection if it's different with the one on server

Additional Proposals

- 7. UE-NW extended signaling for timing offset handshake between LTE and NR
  - UE sends extended signaling with detected LTE/NR timing offset, suggested SMTC and measurement gap offset to network after detecting the SSB by local gap
  - Network sends RRC reconfiguration message with updated NR measurement configuration
  - Network could collect timing offset reported by UE and optimize the ENDC parameters to align the LTE and NR timing periodically
  - UE applies the updated/correct measurement config
  - UE may trigger local gap and extended signaling to network if the gap configuration is still not the optimal one
  - The UE LTE performance loss due to timing/gap mismatch could be reduced.

Additional Background

TS38.331-f50

–   *SSB-MTC*

The IE *SSB-MTC* is used to configure measurement timing configurations, i.e., timing occasions at which the UE measures SSBs.

***SSB-MTC* information element**

```
-- ASN1START
-- TAG-SSB-MTC-START

SSB-MTC ::=                    SEQUENCE {
    periodicityAndOffset          CHOICE {
        sf5                           INTEGER (0..4),
        sf10                          INTEGER (0..9),
        sf20                          INTEGER (0..19),
        sf40                          INTEGER (0..39),
        sf80                          INTEGER (0..79),
        sf160                         INTEGER (0..159)
    },
    duration                      ENUMERATED { sf1, sf2, sf3, sf4, sf5 }
}

SSB-MTC2 ::=                   SEQUENCE {
    pci-List                      SEQUENCE (SIZE (1..maxNrofPCIsPerSMTC)) OF PhysCellId    OPTIONAL,    -- Need M
    periodicity                   ENUMERATED {sf5, sf10, sf20, sf40, sf80, spare3, spare2, spare1}
}

-- TAG-SSB-MTC-STOP
-- ASN1STOP
```

Additional Background

TS36.133-f60:

8.1.2    Requirements

8.1.2.1    UE measurement capability

If the UE requires measurement gaps to identify and measure inter-frequency and/or inter-RAT cells and the UE does not support perServingCellMeasurementGap-r14 or is not configured with per serving cell measurement gaps, in order for the requirements in the following subsections to apply the E-UTRAN must provide a single measurement gap pattern with constant gap duration for concurrent monitoring of all frequency layers and RATs. If the UE requires measurement gaps to identify and measure inter-frequency and/or inter-RAT cells and the UE supports perServingCellMeasurementGap-r14 and is configured with per serving cell measurement gaps, in order for the requirements in the following subsections to apply the E-UTRAN must provide gap pattern(s) on at least each serving component carrier (per-CC) where the UE has indicated in the *perCC-ListGapIndication* IE that gaps are required. No gap pattern is required to be provided on the serving component carrier where UE has indicated in the the *perCC-ListGapIndication* IE that gaps are not required. The requirements apply if the gap on each serving cell is at least that which the UE has indicated with gapIndication in the *perCC-ListGapIndication* IE, and if the gapOffset, MGRP and MGL are the same for each serving component carrier. During the measurement gaps the UE:

...

TS36.331-f50

—    *PerCC-GapIndicationList*

The IE *PerCC-GapIndicationList* is used to specify the UE measurement gap preference.

*PerCC-GapIndication information elements*

```
-- ASN1START
PerCC-GapIndicationList-r14 ::= SEQUENCE (SIZE (1..maxServCell-r13)) OF PerCC-GapIndication-r14

PerCC-GapIndication-r14 ::=      SEQUENCE {
    servCellId-r14              ServCellIndex-r13,
    gapIndication-r14           ENUMERATED  {gap, no-gap, n-gap spare1}
}

-- ASN1STOP
```

The invention claimed is:

1. A method of inter-radio access technology (IRAT) communication, the method comprising:

communicating, by a user equipment (UE) device, with a first network device that is associated with a first radio access technology (RAT); and receiving, during a particular communication mode of the UE device, one or more synchronization signal blocks (SSBs) from a second network device that is associated with a second RAT different than the first RAT, wherein a quantity of the one or more SSBs received during the particular communication mode from the second network device is based on a duration of operating in the particular communication mode.

2. The method of claim 1, wherein the particular communication mode is a connected mode discontinuous reception off (CDRX OFF) mode of operation.

3. The method of claim 1, further including determining whether to perform multiple measurements associated with the one or more SSBs during the particular communication mode based on one or more of the duration of operating in the particular communication mode or a number of the multiple measurements to be performed.

4. A method of inter-radio access technology (IRAT) communication, the method comprising:

communicating, by a user equipment (UE) device, with a first network device that is associated with a first radio access technology (RAT); and based on a tune-away event from a first subscriber identity module (SIM) of the UE device to a second SIM of the UE device, and further based on expiration of a guard time interval after the tune-away event, receiving one or more synchronization signal blocks (SSBs) from a second network device that is associated with a second RAT different than the first RAT.

5. A method of inter-radio access technology (IRAT) communication, the method comprising:

communicating, by a user equipment (UE) device, with a first network device that is associated with a first radio access technology (RAT);

receiving a plurality of synchronization signal blocks (SSBs) from a plurality of network devices including a second network device, wherein the second network device is associated with a second RAT different than the first RAT;

selecting the second network device from among the plurality of network devices based on a comparison of the plurality of SSBs; and receiving a signal from the second network device via a measurement gap, the measurement gap based on an SSB-based measurement timing configuration (SMTC) window associated with the second network device.

6. A method of inter-radio access technology (IRAT) communication, the method comprising:

communicating, by a user equipment (UE) device, with a first network device that is associated with a first radio access technology (RAT); and receiving, during a measurement gap, one or more synchronization signal blocks (SSBs) from a second network device that is associated with a second RAT different than the first RAT; and releasing local settings data associated with the measurement gap in response to expiration of a threshold time interval since receiving the one or more SSBs.

7. The method of claim 6, wherein the releasing the local settings data is performed further in response to detecting an idle mode of the UE device.

8. The method of claim 6, wherein the releasing the local settings data is performed further in response to terminating communication with the first network device.

9. A method of inter-radio access technology (IRAT) communication, the method comprising:

communicating, by a user equipment (UE) device, with a first network device that is associated with a first radio access technology (RAT); and in response to detection of termination of a high priority event that is associated with disabling of reception of synchronization signal blocks (SSBs) at the UE device, receiving one or more SSBs from a second network device that is associated with a second RAT different than the first RAT.

10. A method of inter-radio access technology (IRAT) communication, the method comprising:

communicating, by a user equipment (UE) device, with a first network device that is associated with a first radio access technology (RAT);

sending a message to a server, the message indicating one or more parameters of local settings data, the local settings data indicating a customized measurement gap for receiving one or more synchronization signal blocks (SSBs) from a second network device that is associated with a second RAT different than the first RAT; and in response to detection of a failure to receive an SSB during a particular threshold time interval, tuning a receiver of the UE device to receive at least one SSB from the second network device based on parameters received from the server.

11. The method of claim 10, further including periodically sending one or more updates of the local settings data to the server.

12. A method of inter-radio access technology (IRAT) communication, the method comprising:

communicating, by a user equipment (UE) device, with a first network device that is associated with a first radio access technology (RAT); and autonomously sending an extended signaling message to a particular network device, the extended signaling message indicating one or more of a synchronization difference between the first network device and a second network device or a timing offset between a measurement gap of the first network device and an SSB based measurement timing configuration (SMTC) window of the second network device, the second network device associated with a second RAT different than the first RAT.

13. The method of claim 12, further including receiving, in response to the extended signaling message and from the particular network device, one or more updated parameters for the measurement gap.

14. The method of claim 12, wherein the UE device autonomously initiates sending the extended signaling message to the particular network device without receiving a request for the extended signaling message.

15. A method of inter-radio access technology (IRAT) communication, the method comprising:

communicating, by a user equipment (UE) device, with a first network device that is associated with a first radio access technology (RAT); and performing one or more of:

in response to detection of a particular communication mode of the UE device, tuning a receiver of the UE device to receive one or more synchronization signal blocks (SSBs) from a second network device that is associated with a second RAT different than the first RAT;

tuning the receiver to receive the one or more SSBs based on a tune-away event from a first subscriber identity module (SIM) of the UE device to a second SIM of the UE device;

tuning the receiver to receive a plurality of SSBs from a plurality of network devices including the second network device and selecting the second network device from among the plurality of network devices based on a comparison of the plurality of SSBs;

releasing local settings data upon detection of a release condition, the local settings data indicating a customized measurement gap for receiving the one or more SSBs;

tuning the receiver to receive the one or more SSBs in response to detection of termination of a high priority event at the UE device;

sending a message to a server, the message indicating one or more parameters of the local settings data;

in response to detection of a failure to receive an SSB during a particular threshold time interval, tuning the receiver to receive at least one SSB from the second network device based on parameters received from the server; or autonomously sending an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

16. The method of claim 15, wherein the particular communication mode is a connected mode discontinuous reception off (CDRX OFF) mode of operation.

17. The method of claim 15, further including determining whether to perform multiple measurements during the particular communication mode based on one or more of a duration of operating in the particular communication mode or a number of the multiple measurements to be performed.

18. The method of claim 15, wherein the tuning the receiver is performed in response to detection of expiration of a guard time interval after the tune-away event.

19. The method of claim 15, wherein the releasing the local settings data is performed in response to detecting an idle mode of the UE device.

20. The method of claim 15, wherein the releasing the local settings data is performed in response to detecting expiration of a threshold time interval since receiving the one or more SSBs.

21. The method of claim 15, wherein the releasing the local settings data is performed in response to terminating communication with the first network device.

22. The method of claim 15, further including periodically sending one or more updates of the local settings data to the server.

23. The method of claim 15, further including receiving, in response to the extended signaling message and from the particular network device, one or more updated parameters for the measurement gap.

24. The method of claim 23, wherein the UE device autonomously initiates sending the extended signaling message to the particular network device without receiving a request for the extended signaling message.

25. An apparatus for inter-radio access technology (IRAT) communication, the apparatus comprising:

at least one processor; and a memory coupled to the at least one processor;

wherein the at least one processor is configured to:

initiate communications with a first network device that is associated with a first radio access technology (RAT); and perform one or more of:

in response to detection of a particular communication mode, tune a receiver to receive one or more synchronization signal blocks (SSBs) from a second network device that is associated with a second RAT different than the first RAT;

tune the receiver to receive the one or more SSBs based on a tune-away event from a first subscriber identity module (SIM) to a second SIM;

tune the receiver to receive a plurality of SSBs from a plurality of network devices including the second network device and select the second network device from among the plurality of network devices based on a comparison of the plurality of SSBs;

release local settings data upon detection of a release condition, the local settings data indicating a customized measurement gap for receiving the one or more SSBs;

tune the receiver to receive the one or more SSBs in response to detection of termination of a high priority event;

initiate transmission of a message to a server, the message indicating one or more parameters of the local settings data;

in response to detection of a failure to receive an SSB during a particular threshold time interval, tune the receiver to receive at least one SSB from the second network device based on parameters received from the server; or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

26. A non-transitory computer-readable medium having program code recorded thereon, the program code comprising:

program code executable by a user equipment (UE) device for causing the UE device to communicate with a first network device that is associated with a first radio access technology (RAT); and program code executable by the UE device for causing the UE device to perform:

in response to detection of a particular communication mode of the UE device, tune a receiver of the UE device to receive one or more synchronization signal blocks (SSBs) from a second network device that is associated with a second RAT different than the first RAT;

tune the receiver to receive the one or more SSBs based on a tune-away event from a first subscriber identity module (SIM) of the UE device to a second SIM of the UE device;

tune the receiver to receive a plurality of SSBs from a plurality of network devices including the second network device and selecting the second network device from among the plurality of network devices based on a comparison of the plurality of SSBs;

release local settings data upon detection of a release condition, the local settings data indicating a customized measurement gap for receiving the one or more SSBs;

tune the receiver to receive the one or more SSBs in response to detection of termination of a high priority event at the UE device;

send a message to a server, the message indicating one or more parameters of the local settings data;

in response to detection of a failure to receive an SSB during a particular threshold time interval, tune the receiver to receive at least one SSB from the second network device based on parameters received from the server; and autonomously send an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

27. An apparatus for inter-radio access technology (IRAT) communication, the apparatus comprising:

means for storing instructions; and means for executing the instructions to initiate communications with a first network device that is associated with a first radio access technology (RAT) and to perform one or more of:

in response to detection of a particular communication mode, tune a receiver to receive one or more synchronization signal blocks (SSBs) from a second network device that is associated with a second RAT different than the first RAT;

tune the receiver to receive the one or more SSBs based on a tune-away event from a first subscriber identity module (SIM) to a second SIM;

tune the receiver to receive a plurality of SSBs from a plurality of network devices including the second network device and select the second network device from among the plurality of network devices based on a comparison of the plurality of SSBs;

release local settings data upon detection of a release condition, the local settings data indicating a customized measurement gap for receiving the one or more SSBs;

tune the receiver to receive the one or more SSBs in response to detection of termination of a high priority event;

initiate transmission of a message to a server, the message indicating one or more parameters of the local settings data;

in response to detection of a failure to receive an SSB during a particular threshold time interval, tune the receiver to receive at least one SSB from the second network device based on parameters received from the server, or autonomously initiate transmission of an extended signaling message to a particular network device, the extended signaling message indicating one or more of a synchronization difference between the first network device and the second network device or a timing offset between a measurement gap of the first network device and an SSB based measurement timing configuration (SMTC) window of the second network device.

28. A method of server operation, the method comprising:

receiving, at a server, a message from a first user equipment (UE) device, the message indicating one or more parameters of local settings data determined by the first UE device;

adding, by the server, information to a database based on the one or more parameters, the information indicating timing parameters for a plurality of network devices;

determining, based on the information of the database, a measurement gap to be used by at least a second UE device to receive one or more synchronization signal blocks (SSBs) from a particular network device of the plurality of network devices; and sending, to the second UE device, an indication of the measurement gap.

29. The method of claim 28, further including:

receiving, by the server and from the first UE device, one or more updates of the local settings data;

updating the information of the database in response to the one or more updates; and sending, to the second UE device, a third message indicating an updated measurement gap in response to updating the information of the database.

30. A method of operation of a network device, the method comprising:

receiving, at a particular network device, an extended signaling message autonomously sent by a device, the extended signaling message indicating one or more of a synchronization difference between a first network device and a second network device or a timing offset between a measurement gap of the first network device and a synchronization signal block (SSB) based measurement timing configuration (SMTC) window of the second network device; and based on the extended signaling message, sending, to a user equipment (UE) device, a reconfiguration message indicating updated settings data for the second network device.

31. The method of claim 30, wherein the reconfiguration message is a radio resource control (RRC) reconfiguration message.

32. The method of claim 30, wherein the updated settings data includes one or more dual connectivity parameters for communication using the first network device as a primary node and using the second network device as a secondary node.

* * * * *